(12) United States Patent
Chester et al.

(10) Patent No.: US 12,141,266 B2
(45) Date of Patent: Nov. 12, 2024

(54) PROOF OF AFFINITY TO A SECURE EVENT FOR FRICTIONLESS CREDENTIAL MANAGEMENT

(71) Applicant: Apple Inc., Cupertino, CA (US)

(72) Inventors: Benjamin D. Chester, Mountain View, CA (US); Hubert Greiche, Santa Clara, CA (US); Richard W. Heard, San Francisco, CA (US); Yousuf H. Vaid, Fremont, CA (US); Gianpaolo Fasoli, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 16/921,283

(22) Filed: Jul. 6, 2020

(65) Prior Publication Data

US 2021/0004454 A1 Jan. 7, 2021

Related U.S. Application Data

(60) Provisional application No. 62/871,168, filed on Jul. 7, 2019.

(51) Int. Cl.
*G06F 21/45* (2013.01)
*G06Q 20/36* (2012.01)
(Continued)

(52) U.S. Cl.
CPC ......... *G06F 21/45* (2013.01); *G06Q 20/3674* (2013.01); *G06Q 30/0185* (2013.01);
(Continued)

(58) Field of Classification Search
CPC ............... G06F 21/45; G06Q 20/3674; G06Q 30/0185; G06Q 40/02; G06Q 20/4018;
(Continued)

(56) References Cited

U.S. PATENT DOCUMENTS 7,870,072 B1 * 1/2011 Dennes .................. G06Q 30/04
705/40
8,862,888 B2 * 10/2014 Tolba .................... H04L 9/0866
713/172

(Continued)

OTHER PUBLICATIONS

Apple Inc. "iOS Security Guide (iOS 12.3)", May 2019, 94 pages.

*Primary Examiner* — Gary S Gracia
(74) *Attorney, Agent, or Firm* — DICKINSON WRIGHT RLLP

(57) ABSTRACT

Systems, methods, and computer-readable media for facilitating frictionless credential provisioning on a user computing device are provided. Special "frictionless tokens" (e.g. ownership tokens) may be generated for each existing credential in a user's digital wallet. Such tokens may be stored in a user's AE locker (e.g. iCloud keychain) and synchronized across the user's devices using any suitable security features (e.g. using any suitable secure enclave processor ("SEP")-based encryption). Such a token, as may be stored in a device's SEP, may be configured only to be read on that physical device. In this manner, the user may no longer need provide further proof of ownership of a credential or be hassled by passing any other challenge, but, instead, the additional security may be achieved using the ownership token, which may use the user's AE or device passcode in association with the user's physical device (and its SEP).

20 Claims, 12 Drawing Sheets

(51) Int. Cl.
  *G06Q 30/018* (2023.01)
  *G06Q 40/02* (2023.01)
  *H04L 9/32* (2006.01)
  *H04L 9/40* (2022.01)
  *G06Q 20/40* (2012.01)

(52) U.S. Cl.
  CPC ........... *G06Q 40/02* (2013.01); *H04L 9/3236* (2013.01); *H04L 63/083* (2013.01); *H04L 63/0853* (2013.01); *H04L 63/102* (2013.01); *G06Q 20/4018* (2013.01); *G06Q 2220/00* (2013.01); *H04L 2463/082* (2013.01)

(58) Field of Classification Search
  CPC . G06Q 2220/00; H04L 9/3236; H04L 63/083; H04L 63/0853; H04L 63/102; H04L 2463/082
  See application file for complete search history.

(56) References Cited

U.S. PATENT DOCUMENTS

| | | | |
|---|---|---|---|
| 9,842,330 B1* | 12/2017 | Van Os | G06Q 20/4014 |
| 10,671,998 B2* | 6/2020 | Kote | G06Q 20/108 |
| 10,846,691 B1* | 11/2020 | Girdhar | G06Q 20/12 |
| 10,949,841 B2* | 3/2021 | Wagner | G06Q 20/322 |
| 11,087,412 B1* | 8/2021 | Ho | G06Q 40/125 |
| 11,238,442 B1* | 2/2022 | Kurani | G06Q 20/405 |
| 11,587,058 B1* | 2/2023 | Kurani | G06Q 20/3223 |
| 2005/0269402 A1 | 12/2005 | Spitzer et al. | |
| 2007/0067642 A1 | 3/2007 | Singhal | |
| 2012/0019361 A1 | 1/2012 | Ayed | |
| 2012/0239936 A1* | 9/2012 | Holtmanns | H04W 12/04 713/168 |
| 2013/0036058 A1 | 2/2013 | Kelly et al. | |
| 2015/0046339 A1* | 2/2015 | Wong | G06Q 20/4016 705/44 |
| 2015/0066768 A1 | 3/2015 | Williamson et al. | |
| 2015/0149359 A1* | 5/2015 | Forte | G06Q 20/405 705/44 |
| 2015/0348025 A1* | 12/2015 | Brown | G06Q 20/367 705/41 |
| 2016/0055577 A1* | 2/2016 | Chidella | G06Q 40/03 705/38 |
| 2017/0213206 A1* | 7/2017 | Shearer | H04W 12/47 |
| 2017/0270517 A1* | 9/2017 | Vasu | G06Q 20/4018 |
| 2018/0082288 A1* | 3/2018 | Chester | G06Q 20/3821 |
| 2018/0091538 A1* | 3/2018 | Narayanan | H04L 63/1425 |
| 2018/0167373 A1* | 6/2018 | Anderson | H04W 4/80 |
| 2018/0336553 A1* | 11/2018 | Brudnicki | G06Q 20/3227 |
| 2018/0349904 A1* | 12/2018 | Dave | G06Q 20/389 |
| 2018/0373853 A1* | 12/2018 | Minami | G06F 21/6218 |
| 2019/0007398 A1* | 1/2019 | Jaladi | H04L 63/0853 |
| 2020/0186561 A1* | 6/2020 | Narayanan | H04W 12/068 |
| 2021/0004454 A1* | 1/2021 | Chester | H04L 63/0807 |

\* cited by examiner

CARD MANAGEMENT APP.

For Selected "Credential DEF":

<ENTER "OWNERSHIP PROOF">

[SUBMIT]

190j (Device 100)
FIG. 3J

---

CARD MANAGEMENT APP.

Congratulations!

"Credential DEF" has been Provisioned on this Device.

190k (Device 100)
FIG. 3K

---

AUTHENTICATION RESOURCE

<ENTER "USER ID">

<ENTER "PASSWORD">

[SUBMIT]

190l (Device 200)
FIG. 3L

---

AUTHENTICATION RESOURCE

YOUR VERIFICATION CODE IS
"XXX-XXX"

190m (Device 200)
FIG. 3M

---

AUTHENTICATION RESOURCE

<ENTER "VERIFICATION CODE">

[SUBMIT]

190n (Device 200)
FIG. 3N

---

AUTHENTICATION RESOURCE

Congratulations!

You have Successfully Accessed Your AE Locker on this Device.

190p (Device 200)
FIG. 3P

---

AUTHENTICATION RESOURCE

<ENTER "AE SECURITY CODE">

[SUBMIT]

190o (Device 200)
FIG. 3O

---

CARD MANAGEMENT APP.

No Credentials On This Device.

Would You Like To Provision A Credential On This Device?
(1) "Credential ABC"    [Yes]
(2) "Credential DEF"    [Yes]
(3) "Credential GHI"    [Yes]
(4) "New Credential"    [Yes]

190q (Device 200)
FIG. 3Q

---

CARD MANAGEMENT APP.

Congratulations!

"Credential ABC" has been Provisioned on this Device.

190r (Device 200)
FIG. 3R

```
CARD MANAGEMENT APP.

Credential(s) On This Device:
        "Credential ABC"

Would You Like To Provision A
  Credential On This Device?
(1) "Credential DEF"    [Yes]
(2) "Credential GHI"    [Yes]
(3) "New Credential"    [Yes]
```
190s (Device 200)
FIG. 3S

```
CARD MANAGEMENT APP.

Congratulations!

"Credential DEF" has been
Provisioned on this Device.
```
190t (Device 200)
FIG. 3T

```
CARD MANAGEMENT APP.

Credential(s) On This Device:
        "Credential ABC"
        "Credential DEF"

Would You Like To Provision A
  Credential On This Device?
(1) "Credential GHI"    [Yes]
(2) "New Credential"    [Yes]
```
190u (Device 200)
FIG. 3U

```
CARD MANAGEMENT APP.

For Selected "Credential GHI":

<ENTER "OWNERSHIP
         PROOF">

[SUBMIT]
```
190v (Device 200)
FIG. 3V

```
CARD MANAGEMENT APP.

Congratulations!

"Credential GHI" has been
Provisioned on this Device.
```
190w (Device 200)
FIG. 3W

```
CARD MANAGEMENT APP.

Credential(s) On This Device:
        "Credential ABC"
        "Credential DEF"
        "Credential GHI"

Would You Like To Provision A
  Credential On This Device?
(1) "New Credential"    [Yes]
```
190x (Device 200)
FIG. 3X

PROOF OF AFFINITY TO A SECURE EVENT FOR FRICTIONLESS CREDENTIAL MANAGEMENT

CROSS-REFERENCE TO RELATED APPLICATION(S)

This application claims the benefit of prior filed U.S. Provisional Patent Application No. 62/871,168, filed Jul. 7, 2019, which is hereby incorporated by reference herein in its entirety.

TECHNICAL FIELD

This disclosure relates to facilitating frictionless credential provisioning on a user electronic device, including to facilitating frictionless provisioning of a credential on a user electronic device using an ownership token proving affinity to a secure event.

BACKGROUND OF THE DISCLOSURE

Portable electronic devices (e.g., cellular telephones and laptop computers) may be provided with secure elements for enabling secure transaction communications with another entity. Often, these communications are associated with commercial transactions or other secure data transactions that require the electronic device to generate, access, and/or communicate a native payment credential, such as a credit card credential, from the secure element to a merchant via a merchant terminal or a merchant's website. However, provisioning such a native payment credential onto an electronic device has often been inefficient.

SUMMARY OF THE DISCLOSURE

This document describes systems, methods, and computer-readable media for facilitating frictionless credential provisioning on a user electronic device.

As an example, a method for increasing the efficiency of credential provisioning using an administration entity ("AE") subsystem is provided that may include, at the AE subsystem, when a first electronic device is fully authenticated for a user account of the AE subsystem, requesting proof of ownership of a funding account, in response to the requesting, receiving from the first electronic device the requested proof of ownership, in response to the receiving the requested proof of ownership, provisioning on the first electronic device a credential associated with the funding account and generating an ownership token based on the credential and a user of the user account and storing the ownership token in an AE locker of the user account, after the storing the ownership token in the AE locker of the user account, when a second electronic device is fully authenticated for the user account, storing the ownership token on the second electronic device, after the storing the ownership token on the second electronic device, receiving from the second electronic device a request to provision the credential on the second electronic device, determining that the received request to provision comprises the ownership token, and, in response to the determining, automatically provisioning on the second electronic device the credential.

As another example, a method for credential provisioning using an administration entity ("AE") subsystem is provided that may include, at the AE subsystem, authenticating an electronic device for a user account of the AE subsystem, in response to the authenticating, identifying an ownership token that is associated with the user account, in response to the identifying, providing the authenticated electronic device with access to the identified ownership token, wherein the identified ownership token is for a funding account, after the providing, receiving from the electronic device a request to provision on the electronic device a credential for the funding account, in response to the receiving, determining that the electronic device has access to the identified ownership token, and, in response to the determining, facilitating the automatic loading of the credential on the electronic device.

As yet another example, a method for credential provisioning using an administration entity ("AE") subsystem is provided that may include, at the AE subsystem, receiving, from an electronic device, a communication that includes an ownership token and a unique user identifier of a user of the electronic device when the electronic device is authenticated for an account of the AE subsystem, after the receiving, determining, using the received communication, that the ownership token was stored at the AE subsystem for a funding account prior to the receiving, and, in response to the determining, facilitating the automatic loading on the electronic device of a credential for the funding account.

This Summary is provided only to present some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which.

DETAILED DESCRIPTION OF THE DISCLOSURE

Systems, methods, and computer-readable media for facilitating frictionless credential provisioning on a user electronic device are provided. Special "frictionless tokens" (e.g., ownership tokens) may be generated for each existing credential in a user's digital wallet. Such tokens may be stored in a user's AE locker (e.g., iCloud keychain) and synchronized across the user's devices using any suitable security features (e.g., using any suitable secure enclave processor ("SEP")-based encryption). Such a token, as may be stored in a device's SEP, may be configured only to be read on that physical device, and not even an AE subsystem may be able to read such data, such that a user's AE security code or other suitable passcode for one of the devices may be required to read the token, which may add an additional authentication factor so that security is preserved even if other authentication (e.g., a 2-factor authentication) is compromised. This may be described herein as "frictionless" because the user may no longer need to provide further proof of ownership of a credential or be hassled by passing any other challenge, but, instead, the additional security may be achieved using the ownership token, which may use the user's AE or device passcode in association with the user's physical device (and its SEP). The processes may utilize AE locker (e.g., keychain) sync across various devices through an AE subsystem, which may be assured by SEP, and/or AE or device passcode as an additional (e.g., third) factor, and/or using existing credentials in a digital wallet, and/or may not rely on biometrics but instead may rely on multiple levels of passwords/passcodes and physical device access as authentication factors.

Figure 1:
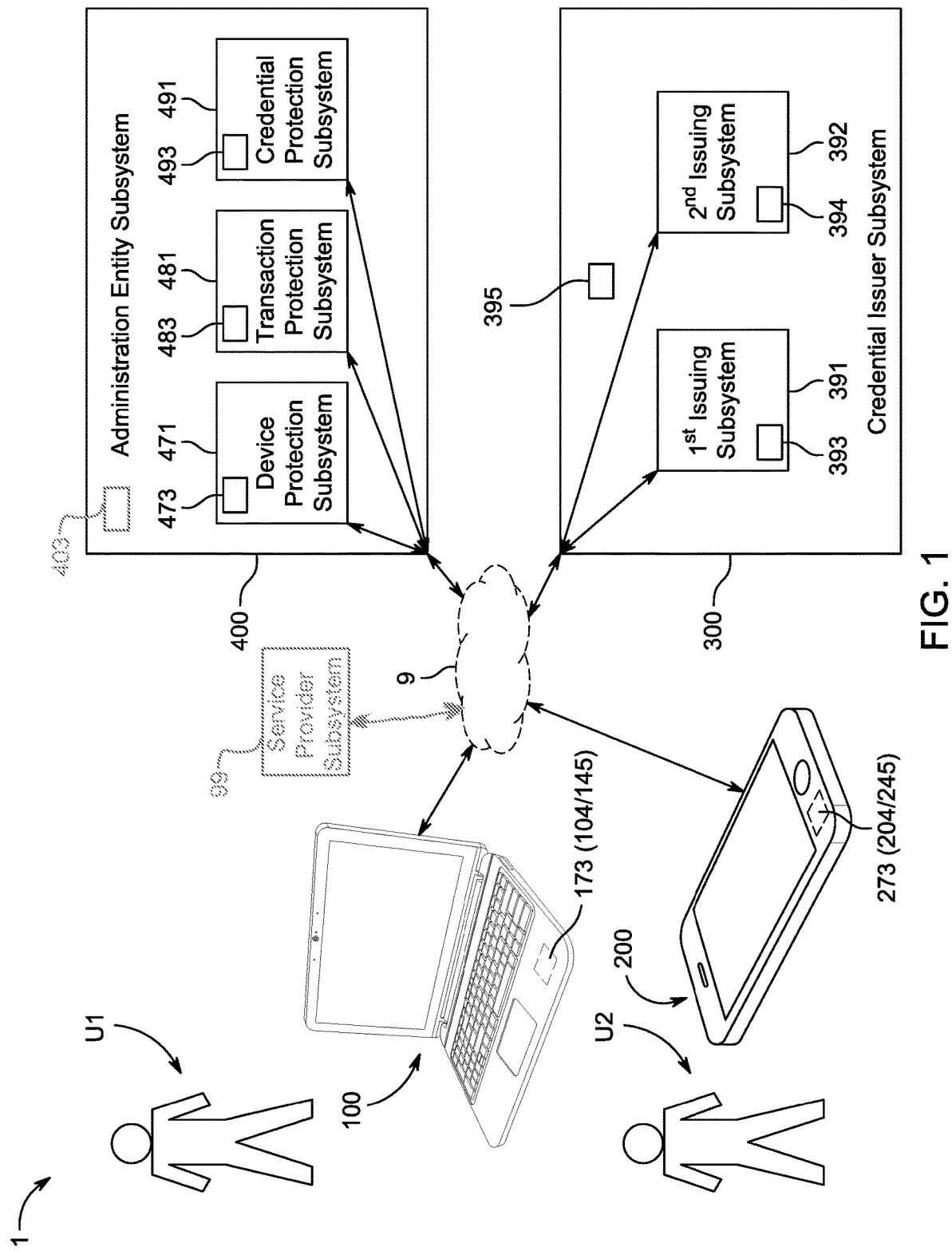
FIG. 1 is a schematic view of an illustrative system for facilitating frictionless credential provisioning.

Description of FIG. 1

FIG. 1 is a schematic view of an illustrative system 1 that may allow for facilitating frictionless credential provisioning on a user electronic device. For example, as shown in FIG. 1, system 1 may include a first end-user host electronic device 100 (e.g., a laptop computer (see, e.g., FIG. 1) or a smart phone (see, e.g., FIG. 3) or a wearable device or the like) that may be accessible to a first user U1 and/or a second user U2 and on which at least one user credential may be provisioned (e.g., on a secure element of first electronic device 100). Moreover, as also shown in FIG. 1, system 1 may include a second end-user host electronic device 200 (e.g., a smart phone (see, e.g., FIG. 1) or a laptop computer or a wearable device or the like) that may be accessible to first user U1 and/or second user U2 and on which at least one user credential may be provisioned (e.g., on a secure element of second electronic device 200). System 1 may also include an administration (or commercial or trusted) entity subsystem 400, a service provider (e.g., merchant or processing) subsystem 99, and a credential issuer (or financial institution) subsystem 300. System 1 may also include an acquiring (or payment processor) subsystem (not shown) that may utilize credential data generated by a credential provisioned on a user electronic device for completing a transaction with credential issuer subsystem 300 on behalf of service provider subsystem 99. Communication of any suitable data between any two of electronic device 100, electronic device 200, service provider ("SP") subsystem 99, administration entity ("AE") subsystem 400, credential issuer ("CI") subsystem 300, and/or any other entities of system 1 may be enabled via any suitable communications set-up 9, which may include any suitable wired communications path, any suitable wireless communications path, or any suitable combination of two or more wired and/or wireless communications paths using any suitable communications protocol(s) and/or any suitable network(s) and/or cloud architecture(s). Each communications path between any two devices or subsystems of system 1 using communications set-up 9 may be at least partially managed by one or more trusted service managers ("TSMs"). Any suitable circuitry, device, system, or combination of these (e.g., a wireless communications infrastructure that may include one or more communications towers, telecommunications servers, or the like) that may be operative to create a communications network may be used to provide one or more of such communications paths, which may be capable of providing communications using any suitable wired or wireless communications protocol. For example, one or more of such communications paths may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof. In some implementations, one or more of such communications paths may, additionally or alternatively, support any wired communication.

A transaction credential (e.g., a payment credential or any other suitable transaction credential (e.g., credentials associated with various credit cards, bank cards, gift cards, access cards, stored value cards, cash cards, digital badges, transit passes, digital currency (e.g., bitcoin and associated payment networks), etc.)) may be provisioned on first electronic device 100 (e.g., on a secure element or other storage component of first electronic device 100) from any suitable credential issuer subsystem 300 (e.g., an issuing bank subsystem or financial institution subsystem), either directly from CI subsystem 300 or via AE subsystem 400, which may be operative to securely communicate credential data onto first device 100 and manage such credential data. For example, CI subsystem 300 may include a first issuing subsystem ("IS") 391 that may be operated by at least one first credential issuing institution (e.g., a first issuing bank, such as Wells Fargo of San Francisco, California) with or without a first payment network institution (e.g., a first payment network, such as MasterCard of Purchase, New York) for provisioning at least one user transaction credential on any suitable user device (e.g., first device 100 or second device 200) for any suitable user (e.g., directly or via AE subsystem 400 (e.g., via a credential protection subsystem 491 of AE subsystem 400)). CI subsystem 300 may include a second issuing subsystem 392 that may be operated by at least one second credential issuing institution (e.g., a second issuing bank, such as Citibank of Sioux Falls, S. Dakota) with or without a second payment network institution (e.g., a second payment network, such as Visa of Foster City, California) for provisioning at least one user transaction credential on any suitable user device (e.g., first device 100 or second device 200) for any suitable user (e.g., directly or via AE subsystem 400 (e.g., via credential protection subsystem 491 of AE subsystem 400)). It is to be understood, however, that first issuing subsystem 391 may be operative to provision one or more first user transaction credentials on first device 100 for first user U1 as well as one or more second user transaction credentials on first device 100 and/or on second device 200 for second user U2, where no issuing subsystem may only be used to provision transaction credentials for a particular user or for a particular device. Moreover, each issuing subsystem may be operative to manage one or more user fund accounts (e.g., bank accounts) that may have funds associated therewith for use in funding a transaction or that may be operative to receive funds in a transaction being funded by another account, where each user fund account may be associated with one or more transaction credentials that may be provisioned on a user electronic device of system 1. Once provisioned on an electronic device, a transaction credential may then be used by that device for securely funding or otherwise conducting a transaction (e.g., a commercial or financial transaction or any other suitable credential transaction) between a first or sender user fund account of an issuing subsystem of subsystem 300 that is associated with that transaction credential as provisioned on the electronic device and any suitable second or receiver user fund account of an issuing subsystem of subsystem 300 (e.g., a receiver user fund account that may be associated with a credential provisioned on another device or a receiver fund account that may be associated with a merchant SP or any other suitable entity). For example, once provisioned on an electronic device, a transaction credential may then be used by that electronic device for securely funding or otherwise conducting a transaction (e.g., a commercial or financial transaction or any other suitable credential transaction) with SP subsystem 99 (e.g., any suitable subsystem that may be operative to provide access to any suitable good or service as part of a transaction). For example, while interfacing with SP subsystem 99 (e.g., via an online resource (e.g., an online app or web browser) or via a contactless proximity-based communication medium) for accessing (e.g., purchasing) a service provider product or service, the electronic device may identify a particular transaction credential to be used for funding or otherwise furthering a transaction to access the service provider product.

AE subsystem 400 may include credential protection subsystem 491 that may be operative to provide an additional layer of security and/or efficiency to the provisioning of credentials on any electronic device (e.g., first device 100 and/or second device 200) and/or to the utilizing of credential data provisioned on any electronic device (e.g., first device 100 and/or second device 200) for securely funding or otherwise conducting a transaction. For example, credential protection subsystem 491 may be operative to validate the trustworthiness of one or more issuing subsystems of CI subsystem 300 on behalf of an electronic device prior to enabling credential provisioning from an issuing subsystem onto the electronic device, and/or credential protection subsystem 491 may be operative to encrypt, encode, or otherwise secure the communication of transaction credential information from an issuing subsystem to any electronic device (e.g., first device 100 and/or second device 200) for ensuring secure credential provisioning on the electronic device. Additionally or alternatively, credential protection subsystem 491 may be operative to validate the trustworthiness of a receiver user account identified by a sending electronic device (e.g., first device 100 and/or second device 200) prior to enabling transaction credential data (e.g., sender transaction credential data or sender device payment credential data) from that electronic device to be shared for use in funding that receiver user account (e.g., an account associated with a merchant subsystem or with a receiving electronic device or the like). Additionally or alternatively, credential protection subsystem 491 may be operative to encrypt, encode, or otherwise secure the communication of transaction credential data from any electronic device (e.g., first device 100 and/or second device 200) to CI subsystem 300 for ensuring secure transaction credential data sharing while furthering a transaction (e.g., between device 100 and a receiver user account of issuer subsystem 300).

Moreover, AE subsystem 400 may include a device protection subsystem 471 that may be operative to provide an additional layer of security to a system device (e.g., if device 100 were to be lost or stolen). Device protection subsystem 471 may enable a user of any electronic device (e.g., first device 100 and/or second device 200) to register the device with AE subsystem 400 for receiving one or more support services of device protection subsystem 471. One or more services of device protection subsystem 471 may be operative to track the location of a registered device and/or remotely control one or more functions of a registered device, such as turn on an alarm and/or erase or suspend or otherwise terminate the usefulness of certain device content, such as suspend the ability for the secure element of the device to generate transaction credential data (e.g., for use in furthering a transaction with a receiver user account or service provider). Such services may be useful to a device owner when a registered device may be lost or stolen such that the device may be recovered and/or such that sensitive data on the device may not be accessed. Additionally or alternatively, device protection subsystem 471 may be operative to associate certain social tokens (e.g., e-mail addresses, telephone numbers, etc.) with certain registered devices and/or to enable certain secure communications between registered devices and/or to associate certain registered devices with a certain AE user account of AE subsystem 400. Moreover, AE subsystem 400 may include a transaction protection subsystem 481 that may be operative to provide an additional layer of security for determining a risk associated with a proposed transaction being facilitated by AE subsystem 400.

Description of FIGS. 2, 2A, 3, and 3A-3X

Figure 2:
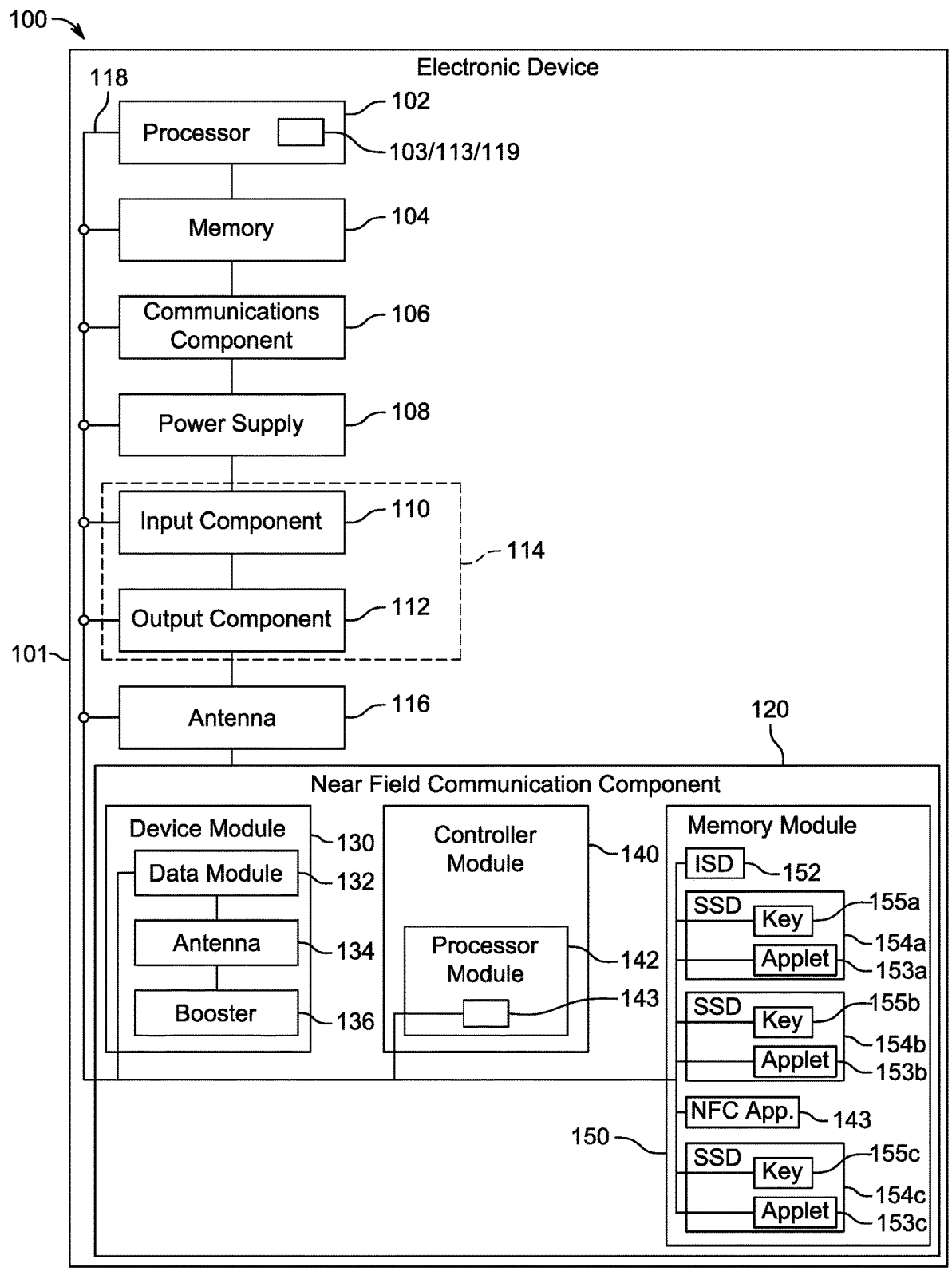
FIG. 2 is a more detailed schematic view of an example of one of the electronic devices of the system of FIG. 1.

FIG. 2 shows a more detailed view of example user electronic device 100 of system 1. As shown in FIG. 2, for example, device 100 may include a processor 102, memory 104, communications component 106, power supply 108, input component 110, output component 112, antenna 116, and near field communication component 120. Device 100 may also include a bus 118 that may provide one or more wired or wireless communication links or paths for transferring data and/or power to, from, or between various other components of device 100. Device 100 may also be provided with a housing 101 that may at least partially enclose one or more of the components of device 100 for protection from debris and other degrading forces external to device 100. In some embodiments, one or more components of device 100 may be combined or omitted. Moreover, device 100 may include other components not combined or included in FIG. 2. For example, device 100 may include any other suitable components or several instances of the components shown in FIG. 2. For the sake of simplicity, only one of each of the components is shown in FIG. 2. Electronic device 100 may be any portable, mobile, wearable, implantable, or hand-held electronic device configured to store one or more transaction credentials for use in furthering a transaction (e.g., with a receiver user account). Alternatively, electronic device 100 may not be portable during use, but may instead be generally stationary. Electronic device 100 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, wearable device (e.g., an Apple Watch™ by Apple Inc.), boom box, modem, router, printer, and any combinations thereof.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., applications for implementing functions on device 100), firmware, preference information (e.g., media playback preferences), lifestyle information (e.g., food preferences), exercise information (e.g., information obtained by exercise monitoring equipment), transaction information, wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof. Communications component 106 may be operative to enable device 100 to communicate with one or more other electronic devices (e.g., device 200) or servers or subsystems (e.g., one or more of subsystems 99, 300, and 400) using any suitable communications protocol(s) (e.g., wired and/or wireless protocol(s) via communications set-up 9). Power supply 108 may provide power to one or more of the components of device 100. In some embodiments, power supply 108 can be coupled to a power grid (e.g., when device 100 is being charged or is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells). One or more input components 110 may be provided to permit a user or the ambient environment or remote data sources to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of device 100 may include any processing circuitry that may be operative to control the operations and performance of one or more components of device 100. For example, processor 102 may receive input signals from input component 110 and/or drive output signals through output component 112. Processor 102 of host device 100 may include any suitable processing circuitry that may be operative to control the operations and performance of one or more components of host device 100. As shown in FIG. 2, processor 102 may be used to run one or more applications (e.g., an application 103 and/or an application 113) that may at least partially dictate the way in which data may be received by, generated at, and/or communicated from device 100. As one example, application 103 may be an operating system application while application 113 may be a third party application or any other suitable online resource (e.g., a contacts or address book application, a protection application and/or device-to-device communication application (e.g., a communication application associated with device protection subsystem 471 of AE subsystem 400), a credential issuer application (e.g., a credential issuer application associated with a credential issuing subsystem of CI subsystem 300), an application associated with a merchant of an SP subsystem 99, etc.). Moreover, as shown, processor 102 may have access to any suitable device identification information 119, which may be utilized by a user of device 100 and/or AE subsystem 400 and/or issuer subsystem 300 and/or any SP subsystem 99 for providing any suitable identification of device 100. As just one example, device identification information 119 may be any suitable social token (e.g., telephone number or e-mail address associated with device 100) or any suitable unique identifier that may be associated with device 100 or a component thereof (e.g., a unique device identifier of device 100 or a unique secure element identifier ("SEID") of a secure element of device 100 or the like).

Near field communication ("NFC") component 120 may be configured to communicate transaction credential data (e.g., sender transaction credential data or sender device payment credential data) and/or any other suitable data as a contactless proximity-based communication (e.g., near field communication) with a merchant or SP subsystem 99 (e.g., with an SP NFC terminal of SP subsystem 99 that may be located at a brick and mortar store or any physical location at which a user of device 100 may use a credential to conduct a transaction with a proximately located SP terminal via a contactless proximity-based communication). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. NFC component 120 may allow for close range communication at relatively high data rates (e.g., 370 Mbps), and may comply with any suitable standards, such as the TransferJet™ protocol. Communication between NFC component 120 and an NFC component of an SP subsystem or any other suitable entity of system 1 may occur within any suitable close range distance between the NFC component and the other entity, such as a range of approximately 2 to 4 centimeters, and may operate at any suitable frequency (e.g., 13.56 MHz). For example, such close range communication of an NFC component may take place via magnetic field induction, which may allow the NFC component to communicate with other NFC devices and/or to retrieve information from tags having radio frequency identification ("RFID") circuitry. While NFC component 120 may be described with respect to near field communication, it is to be understood that component 120 may be configured to provide any suitable contactless proximity-based mobile payment or any other suitable type of contactless proximity-based communication between device 100 and another entity, such as a terminal of an SP subsystem. For example, NFC component 120 may be configured to provide any suitable short-range communication, such as those involving electromagnetic/electrostatic coupling technologies.

NFC component 120 may include any suitable modules for enabling contactless proximity-based communication between device 100 and such a remote terminal (e.g., an SP terminal). As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a remote terminal as part of a contactless proximity-based or NFC communication. NFC data module 132 may be configured to contain, route, or otherwise receive any suitable data that may be received by NFC component 120 from a remote terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between device 100 and a remote terminal. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communications between device 100 and a remote terminal. NFC memory module 150 may be tamper resistant and may provide at least a portion of a secure element 145 of device 100. For example, secure element 145 may be configured to provide a tamper-resistant platform (e.g., as a single-chip or multiple-chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of a CI subsystem and/or a financial institution subsystem and/or an industry standard, such as GlobalPlatform).

As shown, for example, NFC memory module 150 may include one or more of an issuer security domain ("ISD") 152, one or more supplemental security domains ("SSDs") 154a-154c (e.g., a service provider security domain ("SPSD"), a trusted service manager security domain ("TSMSD"), credential SSD, access SSD, etc.), which may be defined and managed by an NFC specification standard (e.g., GlobalPlatform). For example, ISD 152 may be a portion of NFC memory module 150 in which a trusted service manager ("TSM") or issuing financial institution (e.g., issuer subsystem 300) may store one or more keys (e.g., ISD key 156k) and/or other suitable information for creating or otherwise provisioning one or more credentials (e.g., credentials associated with various credit cards, bank cards, gift cards, access cards, stored value cards, cash cards, digital badges, transit passes, digital currency (e.g., bitcoin and associated payment networks), etc.) on device 100 (e.g., via communications component 106), for credential content management, and/or security domain management. A credential may include credential data (e.g., credential information 161a) that may be assigned to a user/consumer (e.g., by an issuing subsystem) and that may be stored securely on electronic device 100 and/or uniquely generated on electronic device 100. For example, such credential data (e.g., credential information 161a) may include a device primary account number ("DPAN") or send token (e.g., a 16-19 character token, which may be similar to a credit/debit card number that may be compatible with various card networks, or a device account reference ("DAR") (e.g., a well-defined formatted string, which may contain a globally unique identifier ("GUID") or a universally unique identifier ("UUID") (e.g., a 128-bit integer number that may be used to identify one or more resources) and/or a code (e.g., a bank code) that may identify a particular source (e.g., issuing subsystem))), DPAN expiry date, a card verification code ("CVV"), and/or the like (e.g., as a token or otherwise). NFC memory module 150 may include at least three SSDs 154 (e.g., first credential SSD 154a, second credential SSD 154b, and access SSD 154c). For example, each one of first credential SSD 154a and second credential SSD 154b may be associated with a respective specific credential of any suitable type (e.g., a specific credit card credential or a specific stored value account credential or a specific public transit card credential provisioned by issuer subsystem 300) that may provide specific privileges or payment rights to electronic device 100, while access SSD 154c may be associated with a commercial or administration entity (e.g., an entity of AE subsystem 400, which may be a controlling entity for device 100) that may control access of device 100 to a specific credential of another SSD (e.g., first SSD 154a or second SSD 154b), for example, to provide specific privileges or payment rights to electronic device 100. In some embodiments, each one of first SSD 154a and second SSD 154b and third SSD 154c may be a credential SSD and may be associated with a respective specific credential of any suitable type (e.g., a specific credit card credential or a specific stored value account credential or a specific public transit card credential provisioned by issuer subsystem 300) that may provide specific privileges or payment rights to electronic device 100. Each SSD 154 may include and/or be associated with at least one applet 153 (e.g., SSD 154a with applet 153a and SSD 154b with applet 153b). For example, an applet 153 of an SSD 154 may be an application that may run on a secure element of NFC component 120 (e.g., in a GlobalPlatform environment). A credential applet 153 may include or be associated with credential information 161 (e.g., information 161a of applet 153a and/or information 161b of applet 153b). Each SSD 154 and/or applet 153 may also include and/or be associated with at least one of its own keys 155 (e.g., applet 153a with at least one access key 155a and at least one credential key 155a', and applet 153b with at least one access key 155b and at least one credential key 155b').

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. A key of an SSD may provide any suitable shared secret with another entity. Each key and applet may be loaded on the secure element of device 100 by a TSM or an authorized agent or pre-loaded on the secure element before the secure element is first provided on device 100. As one example, while credential SSD 154a may be associated with a particular credit card credential, that particular credential may only be used to communicate a transaction credential data communication from secure element 145 of device 100 to a remote entity for a financial transaction (e.g., for funding a receiver account)

when applet 153*a* of that credential SSD 154*a* has been enabled or otherwise activated or unlocked for such use. Some keys may be generated on-board a secure element or other suitable portion of device 100.

Security features may be provided for enabling use of NFC component 120 that may be particularly useful when transmitting credential information (e.g., confidential payment information, such as credit card information or bank account information of a credential) from electronic device 100 to a remote entity (e.g., for funding a receiver account of CI subsystem 300 (e.g., via AE subsystem 400)) and/or to electronic device 100 from issuer subsystem 300 (e.g., for provisioning on the secure element of device 100) (e.g., via AE subsystem 400)). Such security features also may include a secure storage area that may have restricted access. For example, user authentication via personal identification number ("PIN") entry or via user interaction with a biometric sensor may need to be provided to access the secure storage area. As an example, access SSD 154*c* may use applet 153*c* to determine whether such authentication has occurred before allowing other SSDs 154 (e.g., credential SSD 154*a* or credential SSD 154*b*) to be used for communicating its credential information 161. In certain embodiments, some or all of the security features may be stored within NFC memory module 150. Further, security information, such as an authentication key, for communicating commerce credential data with a remote entity may be stored within NFC memory module 150 of electronic device 100. In certain embodiments, NFC memory module 150 may include a microcontroller embedded within electronic device 100. As just one example, applet 153*c* of access SSD 154*c* may be configured to determine intent and local authentication of a user of device 100 (e.g., via one or more input components 110, such as a biometric input component) and, in response to such a determination, may be configured to enable another particular SSD for conducting a payment transaction (e.g., with a credential of credential SSD 154*a*).

Additionally, in some embodiments, device 100 may be provided with a secure enclave or secure enclave processor ("SEP"). The SEP may be provided as a coprocessor that may be fabricated within a system on chip ("SoC") of the device. The SEP may be configured to use encrypted memory and include a hardware random number generator. The SEP may be configured to provides some or all cryptographic operations for data protection key management. Communication between the SEP and an application processor of device 100 may be isolated. The SEP may be configured to manage the authentication process and enable a credential funding transaction to proceed. For example, device 100 must be unlocked using any suitable passcode or biometric information, which may be passed to the SEP and/or the SE directly, such as without going through the application processor. Special locker items (e.g., passwords, private keys, special tokens (e.g., ownership tokens for enabling frictionless provisioning and/or login tokens), etc. (e.g., keychain items)) are to be secured in a special storage locker (e.g., keychain). For example, locker items may be encrypted using two different keys (e.g., two AES-256-GCM keys), such as a table key (e.g., metadata key) and a per-row key (e.g., secret key). Locker metadata may be encrypted with the metadata key to speed search while a secret value may be encrypted with the secret key. The metadata key may be protected by the SEP but may be cached in the application processor to allow fast queries of the locker. The secret key may be configured to always require a roundtrip through the SEP. A locker can use access control lists ("ACLs") to set policies for accessibility and authentication requirements. Locker items can establish conditions that may require user presence by specifying that they cannot be accessed unless authenticated with specific authentication information (e.g., using specific user biometrics or by entering a device's security passcode). Access to locker items can also be limited by specifying that such authentication information has not changed since the locker item was added to the locker, where this limitation may help prevent an attacker from adding their own biometrics in order to access a locker item. ACLs may be evaluated inside the secure enclave and may be released to the kernel only if their specified constraints are met. Different lockers may secure different locker items in different ways, such as by a user locker (e.g., user keybag), a device locker (e.g., device keybag), a backup locker (e.g., backup keybag), an escrow locker (e.g., an escrow keybag), and an AE backup locker (e.g., an iCloud Backup keybag), each of which is described by "iOS Security, iOS 12.3, May 2019" as is hereby incorporated by reference herein in its entirety. As described therein, a locker of locker items may be synced between two devices using an AE subsystem 400 without making available to the AE subsystem certain locker items and/or certain passcodes or keys useful for decrypting or accessing the locker or certain locker items.

Figure 2A:
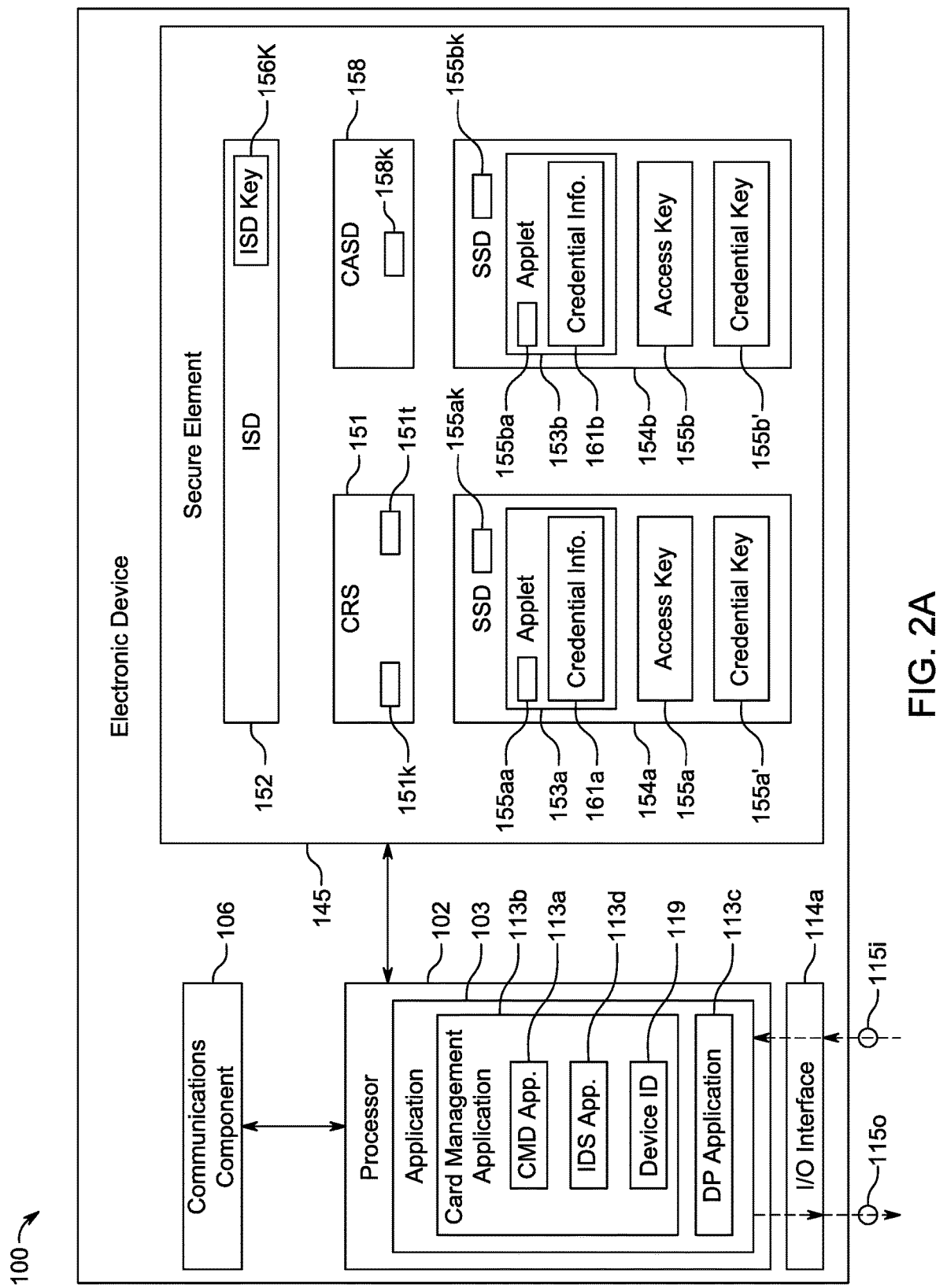
FIG. 2A is another more detailed schematic view of the electronic device of FIGS. 1 and 2.

As shown in FIG. 2A, for example, secure element 145 of NFC component 120 may include SSD 154*a*, which may include or be associated with applet 153*a*, credential information 161*a*, access key 155*a*, and/or credential key 155*a'*, and SSD 154*b*, which may include or be associated with applet 153*b*, credential information 161*b*, access key 155*b*, and/or credential key 155*b'*. In some embodiments, each one of SSDs 154*a* and 154*b* may be associated with a particular TSM and at least one specific commerce credential (e.g., a specific credit card credential or a specific stored value account credential or a specific public transit card credential) that may provide specific privileges or payment rights to electronic device 100 (e.g., SSD 154*a* may be associated with a first transaction credential provisioned from first issuing subsystem 391 of issuer subsystem 300 (e.g., a "Credential ABC") and SSD 154*b* may be associated with a second transaction credential provisioned from first issuing subsystem 391 or second issuing subsystem 392 of issuer subsystem 300 (e.g., a "Credential DEF")). Each SSD 154 may have its own manager key 155 (e.g., a respective one of keys 155*ak* and 155*bk*) that may need to be activated to enable a function of that SSD 154 for use by NFC device module 130. Each SSD 154 may include and/or be associated with at least one of its own credential applications or credential applets (e.g., a Java card applet instances) associated with a particular commerce credential (e.g., credential applet 153*a* of SSD 154*a* may be associated with a first commerce credential and/or credential applet 153*b* of SSD 154*b* may be associated with a second commerce credential), where a credential applet may have its own access key (e.g., access key 155*a* for credential applet 153*a* and/or access key 155*b* for credential applet 153*b*) and/or its own credential key (e.g., credential key 155*a'* for credential applet 153*a* and/or credential key 155*b'* for credential applet 153*b*), and where a credential applet may need to be activated to enable its associated commerce credential for use by NFC device module 130 as an NFC communication (e.g., with a remote terminal) and/or as an online-based communication between device 100 and a remote entity (e.g., between device 100 and CI subsystem 300 (e.g., via AE subsystem 400)).

A credential key of a credential applet may be generated by CI subsystem 300, which may be responsible for such a credential, and may be accessible by that issuer subsystem 300 for enabling secure transmission of that credential information of that applet between secure element 145 and issuer subsystem 300. An access key of a credential applet may be generated by AE subsystem 400 and may be accessible by AE subsystem 400 for enabling secure transmission of that credential information of that applet between secure element 145 and AE subsystem 400. As shown, each applet may include its own unique application identifier ("AID"), such as AID 155aa of applet 153a and/or AID 155ba of applet 153b. For example, an AID may identify a specific card scheme and product, program, or network (e.g., MasterCard Cirrus, Visa PLUS, Interac, etc.), where an AID may include not only a registered application provider identifier ("RID") that may be used to identify a payment system (e.g., card scheme) or network (e.g., MasterCard, Visa, Interac, etc.) of the credential associated with the AID but also a proprietary application identifier extension ("PIX") that may be used to differentiate between products, programs, or applications offered by a provider or payment system of the credential associated with the AID. Any suitable specification (e.g., a Java Card specification) that may be operative to preside over firmware of secure element 145 may be operative to ensure or otherwise force the uniqueness of each AID on secure element 145 (e.g., each credential instance on secure element 145 may be associated with its own unique AID).

As shown in FIG. 2A, secure element 145 may include ISD 152, which may include an ISD key 156k that may also be known to a trusted service manager associated with that security domain (e.g., AE subsystem 400). ISD key 156k may be used by AE subsystem 400 and device 100 similarly to and/or instead of access key 155a and/or access key 155b for enabling secure transmissions between AE subsystem 400 and secure element 145. Moreover, as shown in FIG. 2A, various data may be communicated between processor 102 and secure element 145. For example, processor 102 of device 100 may be configured to run a device application 103 that may communicate information with an application 113 of processor 102 as well as secure element 145, an I/O interface component 114a (e.g., for receiving I/O input data 115i and/or for transmitting I/O output data 115o), and/or communications component 106. Moreover, as shown, processor 102 may have access to device identification information 119, which may be utilized for enabling secure communication between device 100 and one or more remote entities.

As shown in FIG. 2A, secure element 145 may include a controlling authority security domain ("CASD") 158, which may be configured to generate and/or otherwise include CASD access kit 158k (e.g., CASD keys, certificates, and/or signing modules). For example, CASD 158 may be configured to sign certain data on secure element 145 (e.g., using CASD access kit 158k) before providing such data to another portion of device 100 (e.g., communications component 106 for sharing with other subsystems of system 1). Secure element 145 may include a contactless registry services ("CRS") applet or application 151 that may be configured to provide local functionality to electronic device 100 for modifying a life cycle state (e.g., activated, deactivated, suspended, locked, etc.) of certain security domain elements and sharing certain output information 115o about certain security domain elements in certain life cycle states with a user of device 100 (e.g., via a user I/O interface 114a), and may include a CRS list 151t that may maintain a list of the current life cycle state of each security domain element on secure element 145 and may be configured to share the life cycle state of one or more security domain elements with an application of device 100 (e.g., with any suitable application type, such as a daemon, such as card management daemon ("CMD") application 113a that may be running as a background process inside an operating system application 103 and/or a card management application 113b (e.g., a Passbook™ or Wallet™ application by Apple Inc.) and/or a device protection ("DP") application 113c (e.g., an application and/or daemon and/or any suitable authentication resource that may be associated with device protection subsystem 471 of AE subsystem 400) and/or an identity services ("IDS") application 113d, which in turn may provide certain life cycle state information to a user of device 100 as output information 115o via I/O interface 114a and a user interface ("UI") application (e.g., a UI of card management application 113b), which may enable a user to change a life cycle state of a security domain element. CRS 151 may include a CRS access key 151k that may also be known to a trusted service manager associated with CRS 151 (e.g., AE subsystem 400) and may be used by AE subsystem 400 and device 100 similarly to and/or instead of access key 155a and/or access key 155b for enabling secure transmissions between AE subsystem 400 and secure element 145.

DP application 113c may be any suitable application type, such as a daemon, that may be running as a background process inside operating system application 103 and/or card management application 113b and/or that may be provided by CMD application 113a or that may be an application provided by any suitable entity (e.g., an entity responsible for device protection subsystem 471), and may be operative to enable any suitable device protection service(s) to be later activated by device protection subsystem 471 for protecting device 100 in one or more ways. For example, DP application 113c may be a "Find My Device" application (e.g., a "Find My iPhone" or "Find My Mac" application by Apple Inc.) that may be used in conjunction with a service of device protection subsystem 471 (e.g., an iCloud service of Apple Inc.) to track the location of device 100 and/or remotely control one or more functions of device 100, such as turn on an alarm and/or erase or suspend or otherwise terminate the usefulness of certain device content, such as suspend the ability for the secure element of device 100 to generate and/or communicate transaction credential data for use in furthering a transaction with a remote entity. Such a service may be useful to a device owner when device 100 may be lost or stolen such that the device may be recovered and/or such that sensitive data on the device may not be accessed. As another example, DP application 113c may be used as an authentication resource with which a user may interface for attempting to authenticate the user and/or device with an account managed by AE subsystem 400 (e.g., to sync with and/or recover and/or otherwise access or share any suitable secure locker (e.g., an "iCloud Keychain" by Apple Inc., as may be described by "iOS Security, iOS 12.3, May 2019" as is hereby incorporated by reference herein in its entirety)). IDS application 113d may be any suitable application type, such as a daemon, that may be running as a background process inside operating system application 103 and/or card management application 113b and/or that may be provided by CMD application 113a, and may be operative as an IDS manager for listening for and responding to IDS messages that may be sent over any suitable IDS service (e.g., an IDS service of IDS subsystem 471 of AE subsystem 400) to and/or from device 100, which may be similar to any suitable messaging service, such as iMessage™ by Apple Inc., or the like (e.g., FaceTime™ or Continuity™ by Apple Inc.), and/or which may enable unique end-to-end encryption of messages between IDS application 113*d* of device 100 and a similar IDS application of another device (e.g., an IDS application 213*d* of device 200). Such messages may be encrypted using unique identifiers for one or both of the communicating devices (e.g., device unique identifier 119 of device 100 and/or a device unique identifier 219 of device 200) and/or for unique social tokens (e.g., telephone number, etc.) of any specific user(s) of the communicating devices. Such messages may be communicated as a local link or a true device to device (e.g., peer to peer) communication, or may be communicated via AE subsystem 400 (e.g., via an IDS subsystem of AE subsystem 400 (e.g., using an identity management system component)). Such messaging may be enabled as a low latency solution that may allow data to be exchanged in structured formats (e.g., protocol buffers) and/or unstructured formats.

Figure 3:
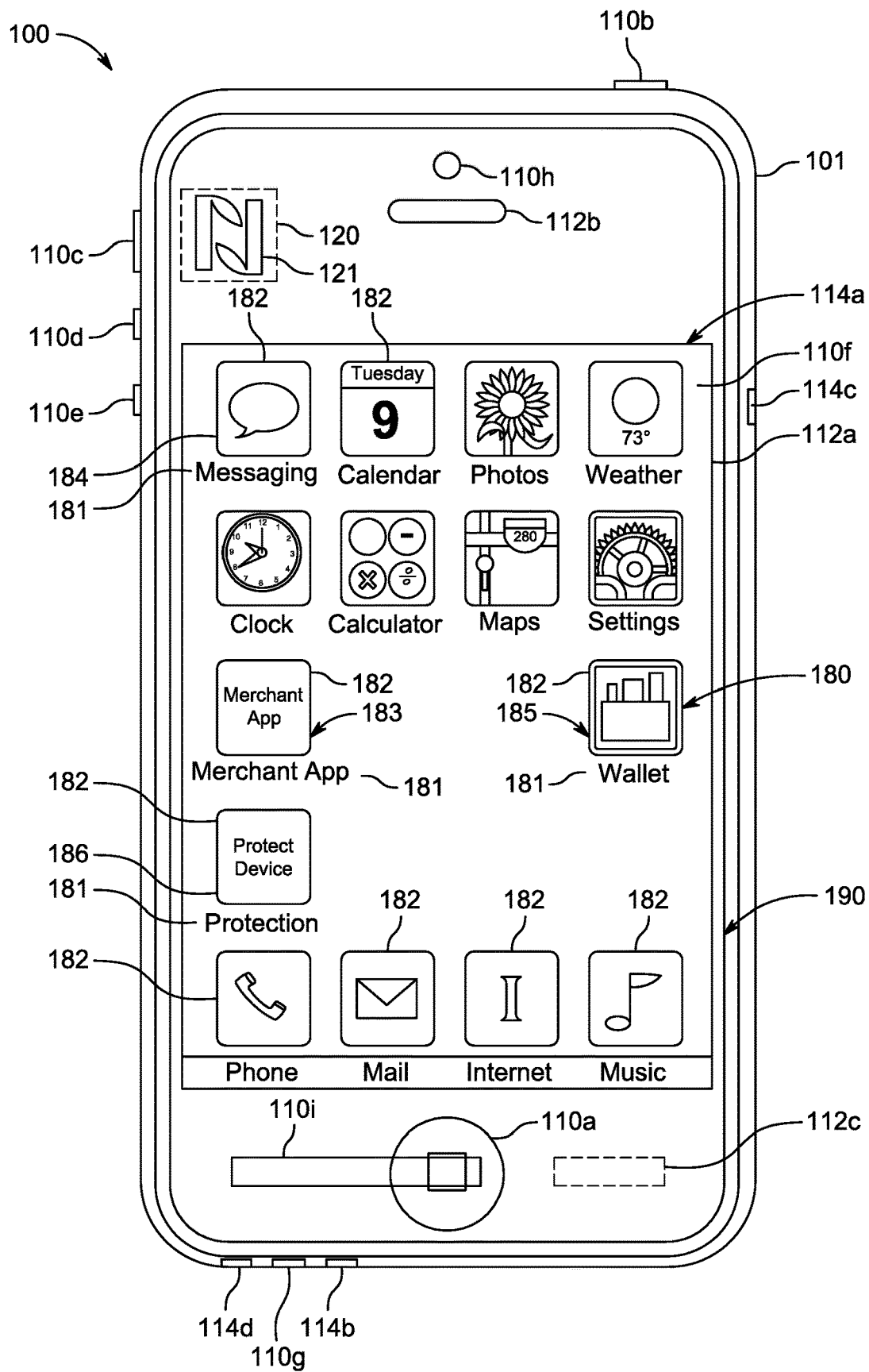
FIG. 3 is a front view of the electronic device of FIGS. 1, 2, and 2A.
Figure 3A:
FIGS. 3A-3X are front views of screens of a graphical user interface of an electronic device of one or more of FIGS. 1-3 illustrating processes for facilitating frictionless credential provisioning.

As shown in FIG. 3, a specific example of electronic device 100 may be a handheld electronic device, such as an iPhone™, where housing 101 may allow access to various input components 110*a*-110*i*, various output components 112*a*-112*c*, and various I/O components 114*a*-114*d* through which device 100 and a user and/or an ambient environment may interface with each other. For example, a touch screen I/O component 114*a* may include a display output component 112*a* and an associated touch input component 110*f*, where display output component 112*a* may be used to display a visual or graphic user interface ("GUI") 180, which may allow a user (e.g., first user U1) to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112*a*. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application (see, e.g., FIGS. 3A-3X for specific examples of such displays of GUI 180 during use of any suitable application 103/113 on device 100 and/or during use of any suitable application 203/213 on device 200). For example, when the specific icon 182 labeled with a "Merchant App" textual indicator 181 (i.e., specific icon 183) is selected by a user of device 100, device 100 may launch or otherwise access a specific third party merchant or SP application and may display screens of a specific user interface that may include one or more tools or features for interacting with device 100 in a specific manner. As another example, when the specific icon 182 labeled with a "Messaging" textual indicator 181 (i.e., specific icon 184) is selected, device 100 may launch or otherwise access a specific device application (e.g., a messaging application), which may provide an administration-entity specific (or other entity specific) communication service (e.g., iMessage™ by Apple Inc.), where such a service may be operative to provide an end-to-end encrypted communication between device 100 and another device (e.g., second user device 200) (e.g., via an identity services ("IDS") subsystem of AE subsystem 400), and where such a service may require registration (e.g., active registration) by each device before device detection may be achieved and/or messages can be sent between the devices using the service (e.g., using an IDS application on each participating device (e.g., IDS application 113*d* of device 100)). Therefore, in some embodiments, certain communications between device 100 and device 200 may be facilitated by and through an IDS subsystem of AE subsystem 400 for enabling a secure and/or efficient communication path between devices. As another example, when the specific icon 182 labeled with a "Wallet" textual indicator 181 (i.e., specific icon 185) is selected, device 100 may launch or otherwise access a specific device application (e.g., card management application 113*b* of FIG. 2A (e.g., as a "Wallet" or "Passbook" application) for managing various credentials on secure element 145) and may display screens of a specific user interface that may include one or more tools or features for interacting with device 100 in a specific manner. As another example, when the specific icon 182 labeled with a "Protection" textual indicator 181 (i.e., specific icon 186) is selected, device 100 may launch or otherwise access a specific device application (e.g., device protection application 113*c* of FIG. 2A (e.g., a "Find My Device" application or an authentication resource)) for enabling certain device protection services to be activated (e.g., by device protection subsystem 471) for protecting device 100 (e.g., if lost, stolen, new, updated, etc.).

Figure 2B:
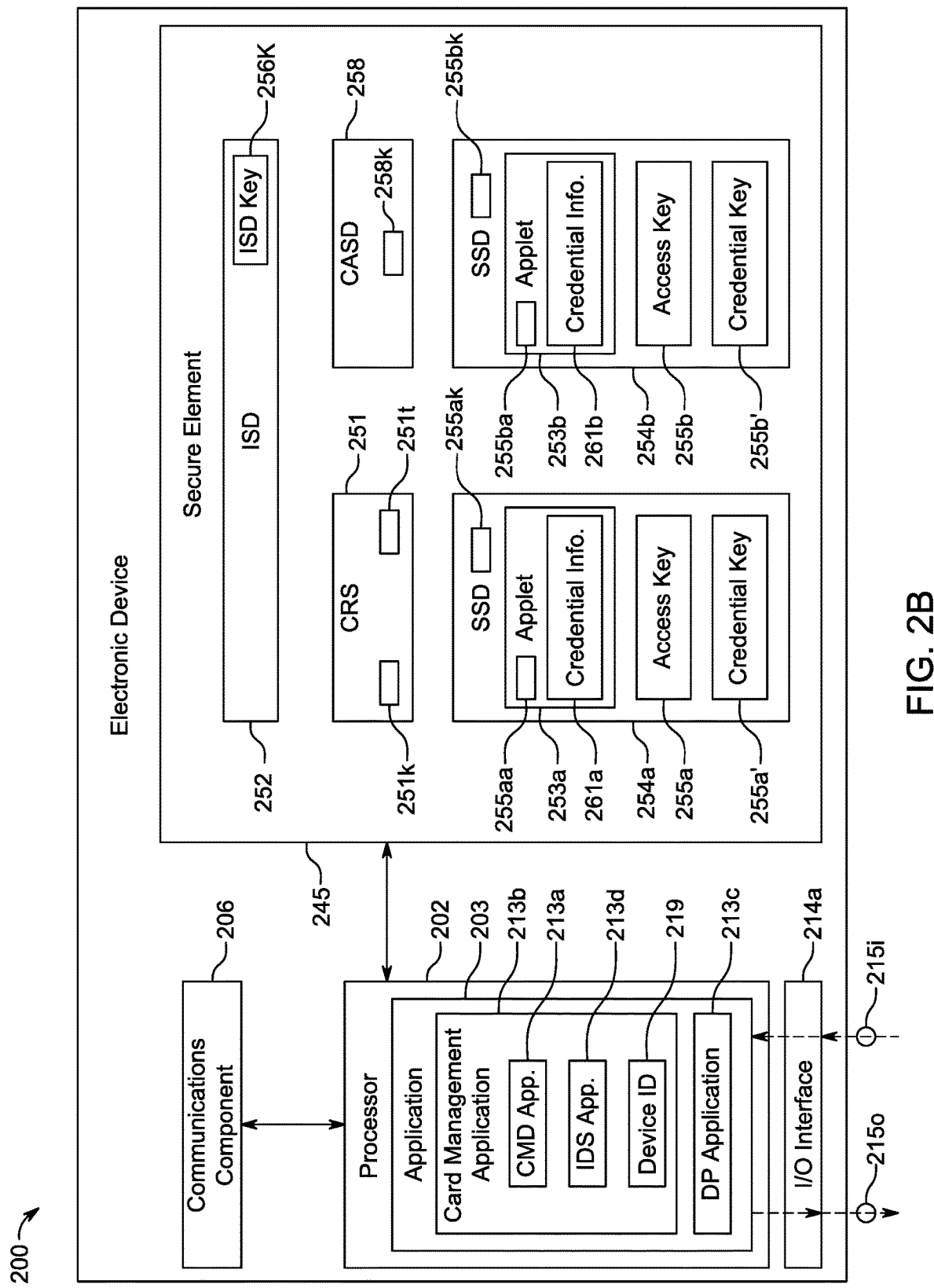
FIG. 2B is a more detailed schematic view of an example of another one of the electronic devices of the system of FIG. 1.

While FIGS. 2, 2A, and 3 may be described with respect to first device 100, it is to be understood that one, some, or all of the components of device 100 of any one or more of FIGS. 2, 2A, and 3 may similarly be provided by second device 200. For example, as shown in FIG. 2B, second device 200 may include one, some, or each of the same elements as first device 100, where, unless otherwise noted, each element 2XX of device 200 of FIG. 2B may be similar to a respective element 1XX of device 100 of FIG. 2A. For any applicable application, screens may be displayed on a display output component of a user electronic device (e.g., display output component 112*a* of device 100) and may include various user interface elements. For each application, various other types of non-visual information may be provided to a user via various other device output components (e.g., various other device output components 112 of device 100 other than display output component 112*a*). In some embodiments, one or each of devices 100 and 200 may not include a user interface component operative to provide a GUI but may instead be considered a more automated device. For example, one or each of devices 100 and 200 may not include a user interface component operative to provide a GUI but may include one or more user interface components operative to provide an audio and/or haptic output to a user and/or to provide mechanical or other suitable user input components for selecting and authenticating provisioning of a credential and/or use thereof for funding a transaction.

As mentioned, CI subsystem 300 may include at least one issuing subsystem (e.g., at least one issuing bank subsystem), such as first issuing subsystem 391 and second issuing subsystem 392. Additionally, in some embodiments, issuer subsystem 300 may include at least one network subsystem (e.g., at least one payment network subsystem (e.g., a payment card association or a credit card association)), such as a first network subsystem and a second network subsystem. For example, each issuing subsystem may be a financial institution that may assume primary liability for an associated user's capacity to pay off debts they may incur while using a specific payment card and its associated credential applets on a user device. One or more specific credential applets of device 100 may be associated with a specific payment card or funding card that may be electronically linked to a fund account or accounts of a particular user or group of users (e.g., a joint account of two or more family members) managed by a particular issuing subsystem of CI subsystem 300. Various types of payment cards may be suitable, including credit cards, debit cards, charge cards, stored-value cards or stored-value accounts, fleet cards, gift cards, and the like. The credential of a specific payment card may be provisioned on device 100 (e.g., as a transaction credential of a credential supplemental security domain ("SSD") of NFC component 120) by a particular issuing subsystem of issuer subsystem 300 (e.g., directly or via AE subsystem 400), and that provisioned credential may then be used by device 100 for generating transaction credential data (e.g., sender device payment credential data) that may be used as a portion of a transaction credential data communication that may be communicated from device 100 for initiating the funding of a receiver user fund account that may be managed by the same or another particular issuing subsystem of CI subsystem 300 (e.g., a receiver user fund account that may be associated with a credential of a specific payment card provisioned on second device 200 or of a SP subsystem 99), where such funding may be provided by a sender user fund account that may be associated with the provisioned credential on device 100 that generated the transaction credential data, which may be used to identify the receiver user fund account. Each credential may be a specific brand of payment card that may be branded by a network subsystem of issuer subsystem 300. Each network subsystem of issuer subsystem 300 may be a network of various issuing subsystems of issuer subsystem 300 and/or various acquiring banks that may process the use of payment cards (e.g., commerce credentials) of a specific brand. A network subsystem and an issuing subsystem of issuer subsystem 300 may be a single entity or separate entities. For example, American Express may be both a network subsystem and an issuing subsystem, while, in contrast, Visa and MasterCard may be payment subsystems and may work in cooperation with issuing subsystems, such as Citibank, Wells Fargo, Bank of America, and the like. Although not shown, CI subsystem 300 may also include or have access to a processor component, a communications component, an I/O interface, a bus, a memory component, and/or a power supply component that may be the same as or similar to such components of device 100, one, some or all of which may be at least partially provided by one, some, or each one of first issuing subsystem 391 and second issuing subsystem 392 of CI subsystem 300.

In order for at least a certain type of frictionless provisioning of a credential to occur within system 1 (e.g., a frictionless provisioning of a credential that may be carried out by system 1 onto second device 200 (e.g., a device that has been securely authenticated in order to access an AE locker for enabling frictionless provisioning)), at least one credential should first be securely provisioned on first device 100 (e.g., directly from issuer subsystem 300 or via AE subsystem 400 (e.g., via credential protection subsystem 491)) and/or at least one credential should first be securely provisioned on second device 200 (e.g., directly from issuer subsystem 300 or via AE subsystem 400 (e.g., via credential protection subsystem 491)). For example, first user credential data may be provisioned from CI subsystem 300 (e.g., from first issuing subsystem 391) onto secure element 145 of device 100 (e.g., for first user U1) as at least a portion or all of a credential supplemental security domain of NFC component 120 (e.g., SSD 154a) and may include a credential applet with credential information and/or a credential key, such as payment application or credential applet 153a with credential information 161a and credential key 155a'. Additionally, in some embodiments, second user credential data may be provisioned from CI subsystem 300 (e.g., from second issuing subsystem 392) onto secure element 245 of device 200 (e.g., for first user U1) as at least a portion or all of a credential supplemental security domain of that secure element (e.g., SSD 254a) and may include a credential applet with credential information and/or a credential key, such as payment application or credential applet 253a with credential information 261a and credential key 255a'. Issuer subsystem 300 (e.g., first issuing subsystem 391) may also have access to credential key 155a' (e.g., for decrypting data encrypted by device 100 using credential key 155a'), and issuer subsystem 300 (e.g., second issuing subsystem 392) may also have access to credential key 255a' (e.g., for decrypting data encrypted by device 200 using credential key 255a'). Issuer subsystem 300 may be responsible for management of credentials key 155a' and 255a', which may include the generation, exchange, storage, use, and replacement of such keys. Issuer subsystem 300 may store its version of each credential key in one or more appropriate secure elements of issuer subsystem 300. It is to be understood that each one of credential keys 155a' and 155b' of device 100 and of issuer subsystem 300 may be any suitable shared secret (e.g., a password, passphrase, array of randomly chosen bytes, one or more symmetric keys, respective public-private keys (e.g., asymmetric keys), etc.) available to both or a respective one of the secure element of electronic device 100 and issuer subsystem 300 that may be operative to enable any suitable crypto data (e.g., a cryptogram) or any other suitable data to be independently generated by electronic device 100 and issuer subsystem 300 (e.g., for validating payment data for a financial transaction), such as by using any suitable cryptographic algorithm or cipher whose functional output may be at least partially determined by the shared secret, where such a shared secret may be provisioned on device 100 by issuer subsystem 300, and/or to allow secure encryption and decryption of data communicated between device 100 and subsystem 300. A shared secret may either be shared beforehand between issuer subsystem 300 and device 100 (e.g., during provisioning of a credential on device 100 by issuer subsystem 300), in which case such a shared secret may be referred to as a pre-shared key, or a shared secret may be created prior to use for a particular financial transaction by using a key-agreement protocol (e.g., using public-key cryptography, such as Diffie-Hellman, or using symmetric-key cryptography, such as Kerberos). The shared secret and any suitable cryptographic algorithm or cipher whose functional output may be at least partially determined by the shared secret may be accessible to the secure element of device 100. Similarly, it is to be understood that each one of credential keys 255a' and 255b' of device 200 and of issuer subsystem 300 may be any suitable shared secret available to both the secure element of electronic device 200 and issuer subsystem 300.

AE subsystem 400 (e.g., device protection subsystem 471 and/or transaction protection subsystem 481 and/or credential protection subsystem 491 and/or any other suitable subsystem(s)) may be provided as an intermediary between issuer subsystem 300 and one or both of device 100 and device 200, where AE subsystem 400 may be configured to provide a new layer of security and/or to provide a more seamless user experience when a credential is being provisioned on device 100 or on device 200, and/or when such a provisioned credential is being used as part of a transaction credential data communication from device 100 or device 200 for funding a receiver user account at issuer subsystem 300. AE subsystem 400 may be provided by any suitable administration and/or commercial entity that may offer various services to a user of a user device (e.g., device 100 and/or device 200) via user-specific log-in information to a user-specific account with that administration entity (e.g., via user-specific identification and password combinations) and/or via any alternative or additional suitable authentication factors (e.g., two-factor authentication verification codes (e.g., one-time verification codes that may be sent to a device via a trusted communication mechanism (e.g., via a trusted telephone number associated with the device (e.g., via a short messaging service ("SMS")))) and/or AE security codes (e.g., a passcode local to the device used to unlock the device or a service thereof that may not be known by AE subsystem 400 but that may be proven to AE subsystem 400 to be known by a user of the device (e.g., via any suitable secure remote password protocol ("SRP") and/or augmented password-authenticated key agreement ("PAKE") and/or the like))). For example, AE subsystem 400 may communicate with a user electronic device (e.g., device 100 or device 200) for authenticating the device and/or a user thereof to information of an AE account managed by AE subsystem 400 and/or to information of an AE locker of such an AE account for enabling frictionless provisioning. Such authentication may involve multi-factor authentication including submission of a confirmable "USER ID" and "PASSWORD" combination of an AE account in addition to a confirmable receipt of a (e.g., one-time use) authentication "VERIFICATION CODE" in addition to a confirmable entry of an "AE SECURITY CODE". Additionally or alternatively, such authentication may make accessible to the device an AE locker (e.g., an iCloud Backup keybag or Keychain) that may include accessibility to an encrypted (e.g., secure enclave processor ("SEP")-based encrypted) ownership token ("ownershipToken") that may then be used by the device for enabling AE subsystem 400 to provision a credential onto the device with less friction than may otherwise be allowed without use of such an ownership token.

As just one example, AE subsystem 400 may be provided by Apple Inc. of Cupertino, CA, which may also be a provider of various administration and/or other services to users of device 100 and/or of device 200 (e.g., the iTunes™ Store for selling/renting media to be played by one or each device, the Apple App Store™ for selling/renting applications for use on device 100 (e.g., store 420 for securely delivering applications to one or each device), the Apple iCloud™ Service (e.g., a service of device protection subsystem 471) for storing data from one or each device and/or associating a user with a device and/or providing device protection services (e.g., using DP application 113c on device 100), the Apple Online Store for buying various Apple products online, the Apple iMessage™ Service for communicating media messages between devices, the Apple Pay™ Service (e.g., a service of credential protection subsystem 491) for securing and managing credential provisioning on one or each device and/or securely using transaction credential data from a device for furthering a transaction with a receiver user account, etc.), and which may also be a provider, manufacturer, and/or developer of device 100 itself and/or device 200 itself (e.g., when device 100 and/or device 200 is an iPod™ iPad™, iPhone™, MacBook™, iMac™, Apple Watch™, or the like) and/or of an operating system of one or each device (e.g., device application 103 of device 100 and/or device application 203 of device 200) and/or of any other application of one or each device (e.g., one or more of applications 113a-113d of device 100 and/or one or more of applications 213a-213d of device 200). The administration or commercial entity that may provide AE subsystem 400 (e.g., Apple Inc.) may be distinct and independent from any credential issuing and/or financial entity of issuer subsystem 300. For example, the administration or commercial entity that may provide AE subsystem 400 may be distinct and/or independent from any payment network subsystem or issuing bank subsystem that may furnish and/or manage any user account associated with any payment card or with any transaction credential to be provisioned on user device 100 and/or on user device 200. The entity that may provide AE subsystem 400 (e.g., Apple Inc.) may be distinct and independent from any merchant or SP subsystem 99 (e.g., any SP entity that may provide an SP terminal for NFC communications, a third party application for online communications, and/or any other aspect of an SP subsystem). Such an administration entity may use its potential ability to configure or control various components of device 100 and/or of device 200 (e.g., software and/or hardware components of a device, such as when that entity may at least partially produce or manage device 100 and/or device 200) in order to provide a more seamless user experience for a user of device 100 when he or she wants to provision a credential offered by issuer subsystem 300 on device 100 and/or on device 200 and/or when such a provisioned credential is being used as part of a transaction credential data communication from a user device for funding a receiver account (e.g., an account that may be associated with a credential provisioned by issuer subsystem 300 on device 200 and/or an account associated with an SP subsystem 99) and/or when device 100 may have any device protection services enabled (e.g., via DP application 113c) for facilitating any suitable device protection services by device protection subsystem 471. For example, in some embodiments, device 100 may be configured to communicate with AE subsystem 400 seamlessly and transparently to a user of device 100 for sharing and/or receiving certain data that may enable a higher level of security (e.g., for enabling frictionless credential provisioning and/or during an online-based transaction credential data communication between device 100 and issuer subsystem 300 and/or when device 100 has been reported as lost or stolen). Although not shown, AE subsystem 400 may also include or have access to a processor component, a communications component, an I/O interface, a bus, a memory component, and/or a power supply component that may be the same as or similar to such components of device 100, one, some or all of which may be at least partially provided by one, some, or each one of device protection subsystem 471 and credential protection subsystem 491 and transaction protection subsystem 481 of AE subsystem 400.

In addition to at least one transaction credential being provisioned on first device 100 (e.g., a first user credential as a portion of a first credential SSD 154a with credential key 155a' and credential information 161a), at least one access SSD 154c with an access key 155c may also be provisioned on device 100 in order to more securely enable device 100 to conduct a financial or other secure transaction with a remote entity using that provisioned credential. For example, access data may be provisioned on device 100 as at least a portion of access SSD 154c directly from AE subsystem 400 and may include an access applet 153c with access key 155c. AE subsystem 400 (e.g., credential protection subsystem 491) may also have access to access key 155c (e.g., for decrypting data encrypted by device 100 using access key 155c). AE subsystem 400 may be responsible for management of access key 155c, which may include the generation, exchange, storage, use, and replacement of such a key. AE subsystem 400 may store its version of access key 155c in a secure element of AE subsystem 400. Access SSD 154c with access key 155c may be configured to determine intent and local authentication of a user of device 100 (e.g., via one or more input components 110 of device 100, such as a biometric input component) and, in response to such a determination, may be configured to enable another particular SSD for conducting a payment transaction (e.g., with a user credential of credential SSD 154a or SSD 154b). By storing such an access SSD within secure element 145 of device 100, its ability to reliably determine user intent for and authentication of a secure data transaction may be increased. Moreover, access key 155c may be used to provide increased encryption to any transaction credential data that may be communicated outside of the secure element of device 100. Access data may include issuer security domain ("ISD") key 156k for ISD 152 of secure element 145, which may also be maintained by AE subsystem 400, and may be used in addition to or as an alternative to access key 155c (or one or more other ones of access keys 155a, 155b, 151k, and 158k of device 100). Similarly, in addition to at least one transaction credential being provisioned on second device 200 (e.g., a second user credential as a portion of a first credential SSD 254a with credential key 255a' and credential information 261a), at least one access SSD 254c with an access key 255c may also be provisioned on device 200 in order to more securely enable device 200 to conduct a financial or other secure transaction with a remote entity using that provisioned credential. For example, access data may be provisioned on device 200 as at least a portion of access SSD 254c directly from AE subsystem 400 and may include an access applet 253c with access key 255c. AE subsystem 400 (e.g., credential protection subsystem 491) may also have access to access key 255c (e.g., for decrypting data encrypted by device 200 using access key 255c). AE subsystem 400 may be responsible for management of access key 255c, which may include the generation, exchange, storage, use, and replacement of such a key. AE subsystem 400 may store its version of access key 255c in a secure element of AE subsystem 400. Access SSD 254c with access key 255c may be configured to determine intent and local authentication of a user of device 200 (e.g., via one or more input components of device 200, such as a biometric input component) and, in response to such a determination, may be configured to enable another particular SSD for conducting a payment transaction (e.g., with a user credential of credential SSD 254a or SSD 254b). By storing such an access SSD within secure element 245 of device 200, its ability to reliably determine user intent for and authentication of a secure data transaction may be increased. Moreover, access key 255c may be used to provide increased encryption to any transaction credential data that may be communicated outside of the secure element of device 200. Access data may include issuer security domain ("ISD") key 256k for ISD 252 of secure element 245, which may also be maintained by AE subsystem 400, and may be used in addition to or as an alternative to access key 255c (or one or more other ones of access keys 255a, 255b, 251k, and 258k of device 200). It is to be understood that each one of any shared key(s) between AE subsystem 400 and either one of device 100 or device 200 may be any suitable shared secret (e.g., a password, passphrase, array of randomly chosen bytes, one or more symmetric keys, respective public-private keys (e.g., asymmetric keys), etc.) available to both or a respective one of the secure element of an electronic device and AE subsystem 400 that may be operative to enable any suitable crypto data (e.g., a cryptogram) or any other suitable data to be independently generated by the electronic device and AE subsystem 400 for any suitable security purpose.

Figure 4:
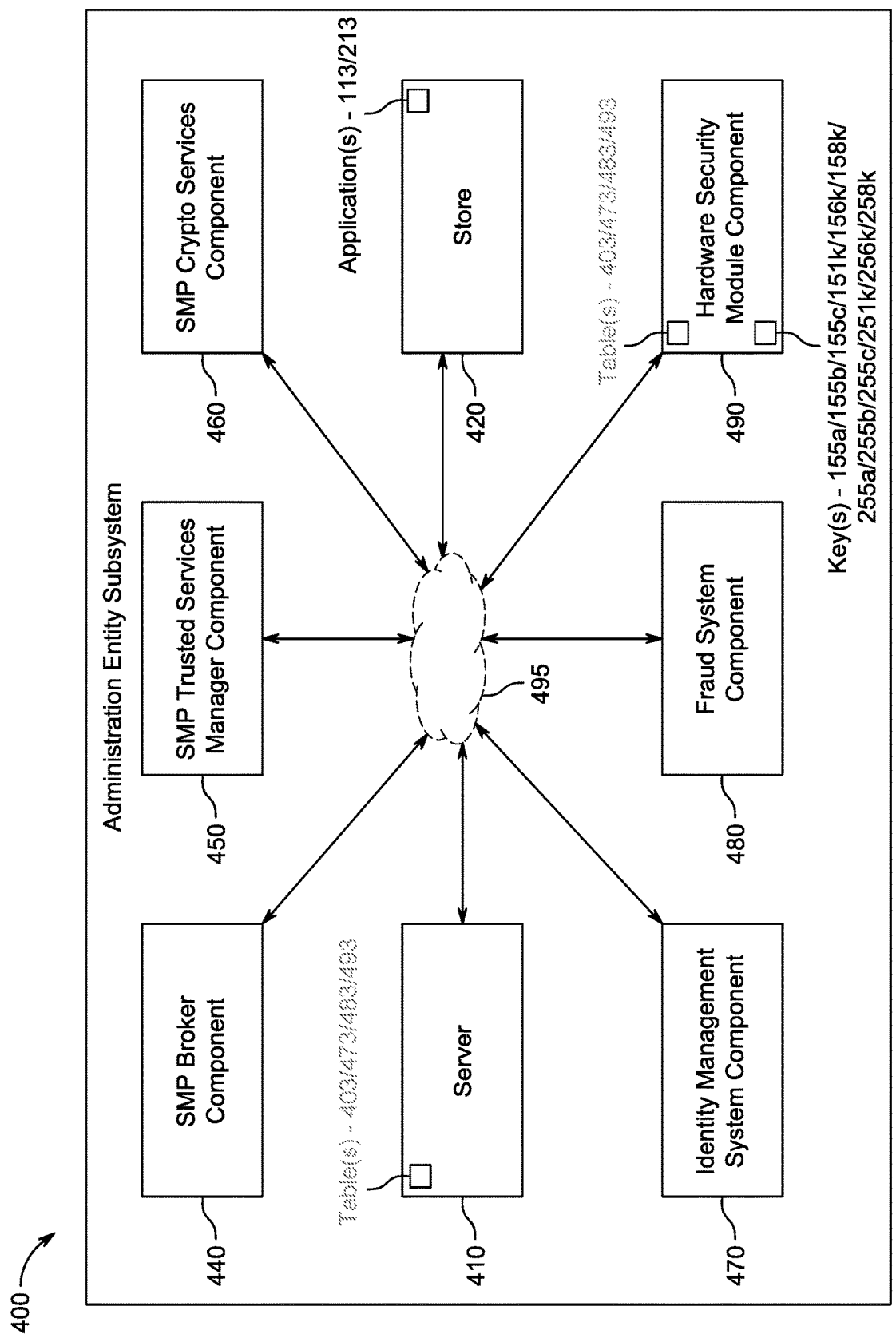
FIG. 4 is a more detailed schematic view of an example administration entity subsystem of the system of FIG. 1.

Description of FIG. 4

FIG. 4 shows further details with respect to various embodiments of AE subsystem 400 of system 1. As shown in FIG. 4, AE subsystem 400 may be a secure platform system and may include a server 410, an online store 420, secure mobile platform ("SMP") broker component 440, an SMP trusted services manager ("TSM") component 450, an SMP crypto services component 460, an identity management system ("IDMS") component 470, a fraud system component 480, and/or a hardware security module ("HSM") component 490. In some embodiments, one or more components of AE subsystem 400 may be combined or omitted. Moreover, AE subsystem 400 may include other components not combined or included in FIG. 4. For example, AE subsystem 400 may include any other suitable components or several instances of the components shown in FIG. 4. For the sake of simplicity, only one of each of the components is shown in FIG. 4. One, some, or all components of AE subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of AE subsystem 400 may be managed by, owned by, at least partially controlled by, and/or otherwise provided by a single administration or commercial entity (e.g., Apple Inc.) that may be distinct and independent from issuer subsystem 300. The components of AE subsystem 400 may interact with each other and collectively with issuer subsystem 300 and/or electronic device 100 and/or electronic device 200 for providing a new layer of security and/or for providing a more seamless user experience. In some embodiments, one, some, or each of device protection subsystem 471, credential protection subsystem 491, and transaction protection subsystem 481 may include its own processing component, memory component, communications component, store 420, SMP broker component 440, SMP TSM component 450, SMP crypto services component 460, IDMS component 470, fraud system component 480, and/or HSM component 490. For example, each one of device protection subsystem 471, credential protection subsystem 491, and transaction protection subsystem 481 may be a discreet subsystem with its own processing components, its own storage components (e.g., its own secure element(s)), and its own communication components.

SMP broker component 440 of AE subsystem 400 may be configured to manage user authentication with an administration or commercial entity user account. SMP broker component 440 may also be configured to manage the lifecycle and provisioning of credentials on device 100 and/or on device 200. SMP broker component 440 may be a primary end point that may control the user interface elements (e.g., elements of GUI 180) on device 100 and/or on device 200. An operating system or other application of an end user device (e.g., application 103, application(s) 113, and/or application 143 of device 100, and/or application 203, application(s) 213, and/or an NFC application of device 200) may be configured to call specific application programming interfaces ("APIs") and SMP broker 440 may be configured to process requests of those APIs and respond with data that may derive the user interface of device 100 and/or of device 200 and/or respond with application protocol data units ("APDUs") that may communicate with secure element 145 of device 100 and/or with secure element 245 of device 200. Such APDUs may be received by AE subsystem 400 from issuer subsystem 300 via a TSM of system 1 (e.g., a TSM of a communication path between AE subsystem 400 and issuer subsystem 300). SMP TSM component 450 of AE subsystem 400 may be configured to provide GlobalPlatform-based services or any other suitable services that may be used to carry out credential provisioning operations on device 100 and/or on device 200 from issuer subsystem 300. GlobalPlatform, or any other suitable secure channel protocol, may enable SMP TSM component 450 to properly communicate and/or provision sensitive account data between secure element 145 of device 100 (or secure element 245 of device 200) and a TSM for secure data communication between AE subsystem 400 and issuer subsystem 300.

SMP TSM component 450 may be configured to use HSM component 490 to protect its keys and generate new keys (e.g., keys 151k, 155a-155c, 156k, 158k, 251k, 255a-255c, 256k, 258k, etc.). SMP crypto services component 460 of AE subsystem 400 may be configured to provide key management and cryptography operations that may be provided for user authentication and/or confidential data transmission between various components of system 1. SMP crypto services component 460 may utilize HSM component 490 for secure key storage and/or opaque cryptographic operations. A payment crypto service of SMP crypto services component 460 may be configured to interact with IDMS component 470 to retrieve information associated with on-file credit cards or other types of commerce credentials associated with user accounts of the administration entity. IDMS component 470 or any other suitable component or subsystem of AE subsystem 400 (e.g., an identity services ("IDS") subsystem) may be configured to enable and/or manage any suitable device detection and/or communication between device 100 and one or more other devices (e.g., second user electronic device 200), such as an identity services ("IDS") transport (e.g., using an administration-entity specific (or other entity specific) service (e.g., iMessage™ by Apple Inc.)). For example, certain devices may be automatically or manually registered for such a service (e.g., all user devices in an eco-system of AE subsystem 400 may be automatically registered for the service), for example, using a unique social token of the device (e.g., a telephone number associated with the device). Such a service may provide an end-to-end encrypted mechanism that may require active registration before device detection may be achieved and/or before messages can be sent using the service (e.g., using an IDS application on each participating device (e.g., IDS applications 113d and 213d), such as a messaging application of icon 184 labeled with "Messaging" textual indicator 181 of screen 190 of GUI 180 of device 100 of FIG. 3). Such an IDS component or subsystem and/or any other suitable server or portion of AE subsystem 400 may be operative to identify or otherwise lookup the status of any credentials provisioned on any electronic devices associated with a given user account or otherwise, such that AE subsystem 400 may be operative to efficiently and effectively identify one or more payment credentials that may be available to a particular device associated with a particular user account (e.g., multiple host devices of a family account with AE subsystem 400). Fraud system component 480 of AE subsystem 400 may be configured to run an administration entity fraud check on a transaction credential based on data known to the administration entity about the transaction credential and/or the sender user and/or the sender user device and/or the receiver user and/or an associated sender user device (e.g., based on data (e.g., transaction credential information) associated with a user account with the administration entity and/or any other suitable data that may be under the control of the administration entity and/or any other suitable data that may not be under the control of issuer subsystem 300). Fraud system component 480 may be configured to determine an administration entity fraud score for the credential based on various factors or thresholds. AE subsystem 400 may include store 420, which may be a provider of various services to users of device 100 and/or of device 200 (e.g., the iTunes™ Store for selling/renting media to be played by a device, the Apple App Store™ for selling/renting applications for use on a device, etc.). As just one example, store 420 may be configured to manage and provide an application 113 to device 100, where application 113 may be any suitable application, such as a banking application, an SP application, an e-mail application, a text messaging application, an internet application, a card management application, a device protection application, or any other suitable communication application. Server 410 may be used to store and/or process any suitable data. For example, a server of AE subsystem 400 may create and/or access and/or process any suitable data of any suitable table or directory or data structure 403 (e.g., more particularly, for example, a server of device protection subsystem 471 may create and/or access and/or process any suitable data of any suitable table or directory or data structure 473, while a server of credential protection subsystem 491 may create and/or access and/or process any suitable data of any suitable table or directory or data structure 493, and/or while a server of transaction protection subsystem 481 may create and/or access and/or process any suitable data of any suitable table or directory or data structure 483). Any suitable communication protocol or combination of communication protocols may be used by a communications set-up 495 of AE subsystem 400 to communicate data amongst the various components of AE subsystem 400 and/or to communicate data between AE subsystem 400 and other components of system 1 (e.g., issuer subsystem 300 and/or device 100 and/or device 200 (e.g., via communications set-up 9)).

Figure 5:
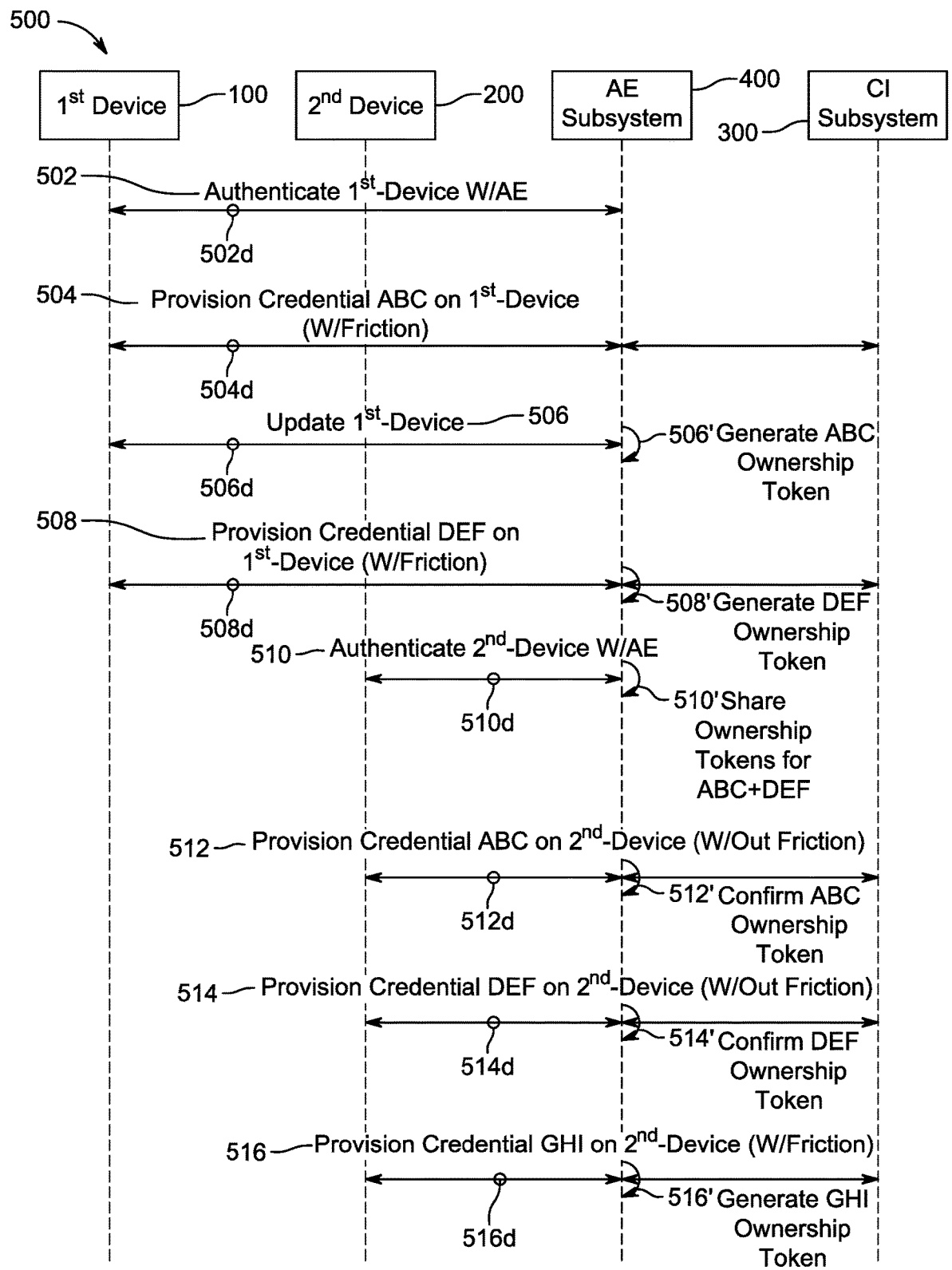
FIGS. 5-8 flowcharts of illustrative processes for facilitating frictionless credential provisioning.

Description of FIG. 5

FIG. 5 is a flowchart of an illustrative process 500 for facilitating frictionless credential provisioning on a user electronic device. Process 500 is shown being implemented by first device 100 (e.g., a user electronic device that may create and/or access and/or process any suitable data of any suitable table or directory or data structure or storage 173 (e.g., memory 104 and/or secure element 145)), second device 200 (e.g., a user electronic that may create and/or access and/or process any suitable data of any suitable table or directory or data structure or storage 273 (e.g., a memory 204 and/or secure element 245)), CI subsystem 300, and AE subsystem 400. However, it is to be understood that process 500 may be implemented using any other suitable components or subsystems. Process 500 may provide a seamless user experience for securely and efficiently (e.g., with less friction) facilitating the provisioning of a credential on a user electronic device using AE subsystem 400, such as for facilitating frictionless provisioning of a credential on a user electronic device using an ownership token proving affinity to a secure event. To facilitate the following discussion regarding the operation of system 1 for provisioning credentials with less friction according to process 500 of FIG. 5, reference is made to various components of system 1 of the schematic diagrams of FIGS. 1, 2, 2A, 2B, and 4, and to front views of screens 190-190x of FIGS. 3-3X that may be representative of a graphical user interface of device 100 and/or of device 200 during such provisioning. The operations described may be achieved with a wide variety of graphical elements and visual schemes. Therefore, the embodiments of FIGS. 3-3X and/or as described are not intended to be limited to particular user interface conventions adopted herein. Rather, embodiments may include a wide variety of user interface styles, including at least partially or totally non-visual user interface styles for user devices.

At operation 502 of process 500, any suitable first user device data 502d (e.g., device registration or authentication data) may be exchanged between first device 100 and AE subsystem 400 (e.g., device protection subsystem 471 and/or credential protection subsystem 491 and/or any suitable subsystem(s) of AE subsystem 400) for initializing, registering, validating, and/or otherwise authenticating device 100 and/or a particular user thereof with AE subsystem 400 in any suitable manner. As mentioned, AE subsystem 400 may be provided by any suitable administration and/or commercial entity that may offer various services to any suitable user of any suitable user device (e.g., user U1 of device 100 and/or of device 200) after any suitable authentication, such as via user-specific log-in information to a user-specific account or group (e.g., family) account with that administration entity (e.g., via a user-specific identifier (e.g., an Apple ID) and password combination (e.g., first factor authentication)), alone or in combination with proof of receipt of a device-specific verification code (e.g., a one-time use SMS verification code (e.g., second factor authentication (e.g., two-factor authentication and/or two-step verification))) and/or in combination with a device-local AE security code (e.g., an iCloud Security Code or user-selected device log-on authentication passcode (e.g., third factor authentication)). Therefore, at operation 502, device 100 may be authenticated with a particular account of user U1 at AE subsystem 400 in any suitable manner.

Figure 3B:
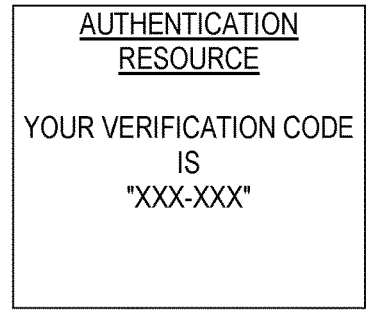
Figure 3C:
Figure 3E:
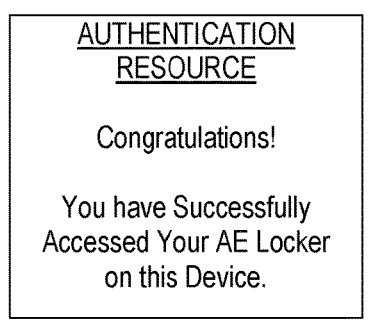
Figure 3D:

For example, at operation 502, user U1 of device 100 may authenticate device 100 with a user account at AE subsystem 400 using an online resource on device 100 (e.g., an authentication resource (e.g., DP application 113c) communicatively coupled to AE subsystem 400) that may be configured to facilitate the authentication process. As shown, by interfacing with the GUI of screen 190a of FIG. 3A, for example, user U1 may enter a "USER ID" (e.g., a first user identifier U1-ID) that may be any suitable data that may uniquely identify first user U1 to AE subsystem 400 and any suitable "PASSWORD" (e.g., a first user password U1-PW) associated therewith (e.g., user-specific log-in information to a user-specific account with the administration entity (e.g., via a user-specific identification and password combination or the like)), and provide (e.g., submit at screen 190a) that user account ID/PW data (e.g., as a portion of device registration or authentication data 502d) to AE subsystem 400 along with any suitable additional information, including, but not limited to, any device registration identifier(s) or any suitable device registration data, such as a unique electronic device identifier ED1-ID of device 100 (e.g., any unique identifier) assigned to device 100 (e.g., by AE subsystem 400), such as at time of device manufacture and/or at least one social identifier or social token LT-1 (e.g., at least one telephone number and/or e-mail address) associated with device 100 for user 1 (e.g., any suitable device identification information 119), such that the device registration data of device 100 may be associated with user U1's verified specific user account at AE subsystem 400 (e.g., at device protection subsystem 471). For example, storage 173 of device 100 may include first user identifier U1-ID and unique electronic device identifier ED1-ID and social token LT-1 (e.g. in a portion or entry of storage 173), and AE table 403 may be updated at operation 502 by storing unique electronic device identifier ED1-ID and/or social token LT-1 of device 100 against the verified user account data of user U1 (e.g., first user identifier U1-ID and/or first user password data U1-PW), for example, by linking such data with any suitable data link(s) in a linked data entry of AE table 403. It is to be understood that, when any first data is described as being stored against any second data, such first data may be stored in association with such second data, such that there may be a relationship between the two instances of data (e.g., such that one can be resolved against the other and/or such that one can be identified using the other). AE subsystem 400 may be operative to validate any or all of the device registration data communicated by device 100 (e.g., unique electronic device identifier ED1-ID and/or social token LT-1) in any suitable manner prior to linking or authenticating that device registration data with a verified user account at device protection subsystem 471. Additionally, at operation 502, user U1 of device 100 may further log into or authenticate its account at AE subsystem 400 (e.g., using an online resource on device 100 (e.g., an authentication resource (e.g., DP application 113c))) through an additional authentication factor. For example, by interfacing with the GUI of screen 190b of FIG. 3B, user U1 may be provided with (e.g., from AE subsystem 400 via any suitable communication mechanism (e.g., SMS to device 100 or any other suitable out of band authentication communication) as a portion of data 502d) a "VERIFICATION CODE" of any suitable (e.g., unique, one-time (e.g., one-time password)) value (e.g., a six-digit alphanumeric verification code). Additionally, at operation 502, user U1 of device 100 may further log into or authenticate its account at AE subsystem 400 (e.g., using an online resource on device 100 (e.g., an authentication resource (e.g., DP application 113c))) through completing such an additional authentication factor. For example, by interfacing with the GUI of screen 190c of FIG. 3C, user U1 may enter such a received "VERIFICATION CODE" and provide (e.g., submit at screen 190c) that verification code data and any other suitable data (e.g., device identification data) to AE subsystem 400 (e.g., as a portion of data 502d) for enabling AE subsystem 400 to authenticate this additional authentication factor of operation 502. Additionally, at operation 502, user U1 of device 100 may further log into or authenticate its account at AE subsystem 400 (e.g., using an online resource on device 100 (e.g., an authentication resource (e.g., DP application 113c))) through yet an additional authentication factor. For example, by interfacing with the GUI of screen 190d of FIG. 3D, user U1 may enter an "AE SECURITY CODE" (e.g., a passcode local to the device that may be used to unlock the device or a service thereof, where the passcode may not be known by AE subsystem 400 but where the passcode may be proven to AE subsystem 400 to be known by a user of the device (e.g., via any suitable SRP or PAKE or the like)) and the entry of a correct (or incorrect) AE SECURITY CODE by the user (e.g., through submit at screen 190d) may enable the device to automatically communicate any suitable AE security data (e.g., as a portion of data 502d) to AE subsystem 400 that may enable AE subsystem 400 to determine whether (or not) the passcode was properly entered by the user in order to determine whether or not to authenticate this additional authentication factor of operation 502. If such an AE SECURITY CODE is properly entered by the user at screen 190*d* and such proper entry may be determined by AE subsystem 400 (e.g., without AE subsystem 400 receiving or storing or otherwise handling the security code itself (e.g., a code that may never leave storage of device 100)), then, additionally, at operation 502, AE subsystem 400 may communicate any appropriate data 502*d* to device 100 for indicating to the user of device 100 that an AE locker of the user's AE account with AE subsystem 400 has been successfully accessed on device 100. For example, by interfacing with the GUI of screen 190*e* of FIG. 3E, user U1 may be provided with (e.g., from AE subsystem 400 as a portion of data 502*d*) an indication that an AE locker of the user's AE account with AE subsystem 400 has been successfully accessed on device 100. Such an authentication process of operation 502 (e.g., a successful three factor authentication process) may enable device 100 to sync or recover or otherwise access or update any suitable AE locker items of the accessed AE locker (e.g., passwords, private keys, certificates, tokens (e.g., ownershipTokens for more efficient (e.g., less friction) credential provisioning), secure notes, etc.).

Figure 3F:
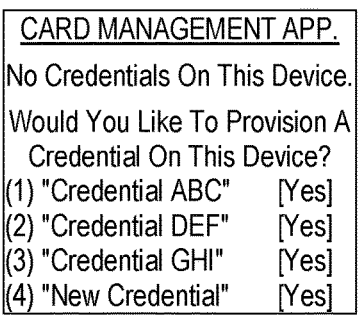
Figure 3G:
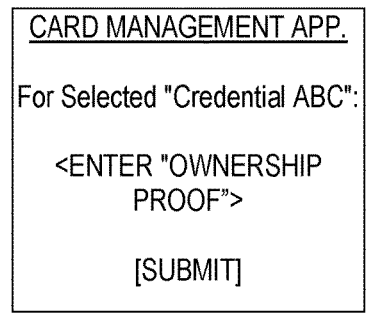

Once a device has been authenticated to some degree with a user's AE account, one or more credentials may be provisioned on the device. For example, once device 100 has been authenticated with a user's AE account at operation 502, a credential "Credential ABC" may be provisioned on device 100 at operation 504 through communication of any suitable provisioning data 504*d* between device 100, AE subsystem 400, and CI subsystem 300. For example, user U1 may interact with a credential management application (e.g., card management application 113*b*) of device 100 that may be communicatively coupled to AE subsystem 400 for determining what credential to provision on device 100. For example, by interfacing with the GUI of screen 190*f* of FIG. 3F, user U1 may be provided with (e.g., from AE subsystem 400 (e.g., as a portion of data 504*d*)) a list of credentials that may be provisioned on device 100, including a "Credential ABC" and a "Credential DEF" and a "Credential GHI", each of which may be a credential already on file (e.g., in any suitable table 403) with the AE subsystem for the AE account of the user authenticated at operation 502 (e.g., credit cards, debit cards, stored value cards, and/or any other suitable credentials that may be known and already authenticated to the user's account at AE subsystem 400 (e.g., as may have been used in the past to pay for media or applications from store 420)), and/or any new credential that may not yet be known by AE subsystem 400 to be associated with the authenticated AE account of the user. In response to being presented with such provisioning options, the user may select a first credential for provisioning on device 100, such as "Credential ABC" (e.g., by selecting [Yes] associated with that credential at screen 190*f*), which may send any suitable credential provisioning selection data of data 504*d* from device 100 to AE subsystem 400 to start the provisioning process of "Credential ABC" onto device 100. Because "Credential ABC" may already be known to AE subsystem 400, there may be no need for the user of device 100 to provide certain details about the credential to AE subsystem 400, such as a primary account number ("PAN") and/or PAN expiry date and/or name associated with the credential or other identification data (e.g., unlike if the user were attempting to provision a "New Credential" not yet associated with the user's authenticated AE account). However, if an ownershipToken has not yet been created for "Credential ABC", such as if operations 502 and 504 were occurring before implementation of certain concepts of this disclosure or before device 100 had updated certain applications (e.g., firmware and/or operating system software and/or the like), then system 1 may still require certain proof of ownership of the credential to be provisioned despite the credential already being associated with the user's authenticated AE account. For example, by interfacing with the GUI of screen 190*g* of FIG. 3G, user U1 may be provided with (e.g., from AE subsystem 400 (e.g., as a portion of data 504*d*)) a request for certain proof of credential ownership information that AE subsystem 400 and/or CI subsystem 300 may require from the user before AE subsystem 400 and/or CI subsystem 300 will allow the selected "Credential ABC" to be provisioned onto device 100. For example, as shown, screen 190*g* may request that the user of device 100 enter and submit any suitable "OWNERSHIP PROOF" of the funding account associated with "Credential ABC". Such ownership proof may be any suitable information, including, but not limited to, the CVV of a card credential (e.g., if the credential is otherwise already associated with the authenticated AE account of the user), the user's mother's maiden name or any other suitable identification information that may be authenticatable by CI subsystem 300 or otherwise as associated with the credential to be provisioned, a CI subsystem verification code that may be sent to device 100 (e.g., as data 504*d*) from CI subsystem 300 for proving to the CI subsystem that the user is in possession of the device, and/or the like. In some embodiments, the proof of ownership may be satisfied by any suitable information indicative of proof of ownership of a physical card associated with the digital credential to be provisioned, including, but not limited to, a PAN (e.g., a 16 digit PAN) and/or CVV and/or issuer one-time verification code and/or any suitable proof data requested of an issuer and/or of the AE. Additionally or alternatively, in some embodiments, the proof of ownership may be satisfied by any suitable information indicative of proof of identity of a user associated with the digital credential to be provisioned, including, but not limited to, a billing address and/or last four digits of a social security number and/or full social security number and/or a scan of a driver's license or other proof of identity document and/or any suitable proof data requested of an issuer and/or of the AE (e.g., when a physical card may not be associated with the digital credential being provisioned). It is to be understood that process 500 may apply to any suitable type of digital credential, whether or not a physical card is or may be associated with the digital credential, including, but not limited to, corporate badges, transit passes, any type of card that can be digitized, and/or the like. Any such request for any such proof of ownership information, whether the user is attempting to provision a credential already known to (e.g., associated with) the authenticated AE subsystem account or a new credential not known to the AE subsystem account, provides a new layer of friction to the user's attempt to provision the credential onto device 100 that may be obviated through use of ownershipTokens (e.g., as described with respect to later operations). However, without use of any ownershipTokens, such a proof of ownership may be required of the user of device 100.

Figure 3H:
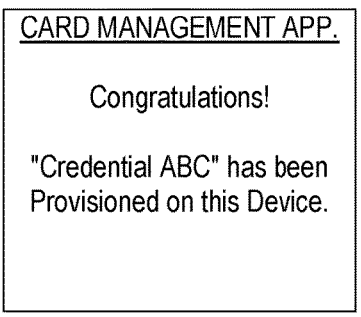

Continuing with operation 504, once the user is able to submit such requested proof of ownership (e.g., through submission at screen 190*g* of any suitable proof of ownership information with data 504*d*), AE subsystem 400 and CI subsystem 300 may then work together, additionally at operation 504, to fully provision the credential onto the device 100 (e.g., with any suitable data 504d). For example, by interfacing with the GUI of screen 190h of FIG. 3H, user U1 may be provided with (e.g., from AE subsystem 400 and/or CI subsystem 300 as a portion of data 504d) an indication that "Credential ABC" has been successfully provisioned on device 100. For such a provisioning of "Credential ABC" at operation 504 (e.g., with user friction (e.g., with requiring active user proof of ownership of the specific credential)), any suitable first user credential data of data 504d may be provisioned on device 100 by CI subsystem 300 (e.g., by first issuing subsystem 391), in some embodiments, via AE subsystem 400 (e.g., via credential protection subsystem 491). For example, such first user credential data may be at least partially provisioned on secure element 145 of device 100 directly from CI subsystem 300. Such first user credential data may be at least partially provisioned on secure element 145 as at least a portion or all of first credential SSD 154a and may include credential applet 153a with credential information 161a and/or credential key 155a' and/or key 155ak. In some embodiments, such first user credential data may also include access key 155a, which may be initially provided from AE subsystem 400 to issuer subsystem 300 and/or may be added by AE subsystem 400. Such first user credential data may include any suitable send token (e.g., a send token ST-la (e.g., a unique identifier associated with an account token (e.g., an account token AT-1a (e.g., an F-PAN)) of the funding account at CI subsystem 300) and that may be used specifically for provisioning a payment credential on a particular user device) as at least a portion of credential information of the payment credential being provisioned (e.g., credential information 161a of applet 153a), an AID (e.g., AID 155aa for applet 153a of the data of the payment credential being provisioned at SSD 154a), an SSD identifier, and/or an SSD counter. It is to be appreciated that send token ST-la may be considered or otherwise referred to herein as a "virtual" credential or virtual PAN or device PAN ("D-PAN") or send device PAN ("SD-PAN") that may be provisioned on device 100 rather than the user's "actual" credential or actual PAN or funding PAN ("F-PAN") (e.g., account token AT-1a). For example, once it is determined that a credential is to be provisioned on device 100, it may be requested (e.g., by issuer subsystem 300, by AE subsystem 400, and/or by a user of device 100) that a virtual credential be generated, linked to the actual credential, and provisioned on device 100 instead of the actual credential for later use in a funding transaction. For example, once it is determined that a credential is to be provisioned on device 100, it may be requested (e.g., by issuer subsystem 300, by AE subsystem 400, and/or by a user of device 100) that a virtual receive credential be generated, linked to the actual credential, and shared with AE subsystem 400 instead of the actual credential for later use in a funding transaction. Such creation and linking of one or more virtual credentials with an actual credential may be performed by any suitable component of issuer subsystem 300. For example, a network subsystem of issuer subsystem 300 (e.g., a particular payment network subsystem that may be associated with the brand of the actual credential) may define and store the link in a table (e.g., any suitable table 395 of CI subsystem 300) that may create associations between the actual credential and at least one virtual credential, such that anytime a virtual credential is utilized for funding a transaction, the payment network subsystem may receive an authorization or validation request or otherwise attempt to validate any received data indicative of that virtual credential and may conduct an analysis of that validation attempt request in light of the actual credential associated with the virtual credential as determined by the table. Alternatively, such a table may be accessible and/or similarly used by an appropriate issuing subsystem (e.g., issuing subsystem 391 or 392) or any other suitable subsystem accessible by CI subsystem 300. By provisioning a virtual credential on device 100 and/or on AE subsystem 400 rather than an actual credential, CI subsystem 300 may be configured to limit the fraudulent activity that may result when the virtual credential is intercepted by an unauthorized user, as a payment network subsystem or issuing subsystem may only be configured to utilize a table for linking the virtual credential to the actual credential during certain transactions, such as when the virtual credential is received by CI subsystem 300 from AE subsystem 400. When a credential is provisioned on a device of an authenticated AE account, information identifying the credential and the device and the provisioning may be maintained by AE subsystem 400 (e.g., in any suitable table 403) for tracking what credentials are on what devices, although specific data identifying a specific funding account may not be known or stored by the AE subsystem (e.g., only a D-PAN or a hash thereof rather than an actual F-PAN may be maintained by the AE subsystem). A credential of such a list of credentials associated with an AE account may be maintained on the list as long as the credential is active on at least one device associated with the AE account.

Despite a credential being provisioned on a device without use of an ownershipToken, an ownershipToken may later be associated with such a provisioned credential. After provisioning "Credential ABC" on device 100 at operation 504 without any ownershipToken, any suitable event may occur that may initiate the creation of an ownershipToken for "Credential ABC" on device 100. For example, at operation 506, any suitable device update event may occur for device 100 that may initiate the automatic creation of an ownershipToken for each credential already provisioned on device 100. As just one example, any suitable application(s) on device 100 (e.g., software or firmware (e.g., application 103, 113b, 113a, 113c, etc.)) may be updated at operation 506 from an earlier version that may not support ownershipTokens to a version that does support ownershipTokens. Such a device update may include any suitable update data 506d being communicated between device 100 and AE subsystem 400, including a request from device 100 to AE subsystem 400 to make such an update, any suitable data from AE subsystem 400 to device 100 to make such an update, and/or the like. When such an update occurs, AE subsystem 400 may be configured to determine that the update will now enable device 100 to support ownershipTokens and to determine that device 100 includes one or more credentials provisioned thereon. For example, as mentioned, because AE subsystem 400 (e.g., credential protection subsystem 491 (e.g., an Apple Pay Server)) may maintain a list (e.g., in any suitable table 403) that may be indicative of the state of each credential provisioned on each device (e.g., per user), AE subsystem 400 may be configured at operation 506 to determine that "Credential ABC" is provisioned on device 100 involved in the update of operation 506. Therefore, in response to AE subsystem 400 determining that the update of operation 506 involves enabling device 100 to support ownershipTokens and in response to AE subsystem 400 determining that "Credential ABC" is currently provisioned on device 100, AE subsystem 400 may be configured to generate and share with device 100 an ownershipToken for "Credential ABC" at operation 506 (e.g., such a token may be generated at a sub-operation 506' and shared with device 100 as at least a portion of data 506d communicated from AE subsystem 400 to device 100). In order for AE subsystem 400 to generate and share such an ownershipToken, AE subsystem 400 may be configured to obtain proof from device 100 that it is the same device on which "Credential ABC" is provisioned. For example, before generating and sharing such an ownershipToken, AE subsystem 400 may first be configured (i) to verify that device 100 of operation 506 is the same device that the AE subsystem identifies in its maintained list of credential/user/device associations as being associated with "Credential ABC" and (ii) to verify that the current user of device 100 at operation 506 is the same user that the AE subsystem identifies in its maintained list of credential/user/device associations as being associated with device 100 and "Credential ABC". For such device authentication of operation 506, AE subsystem 400 may receive (e.g., as a portion of data 506d) the secure element unique identifier ("SEID") of device 100. For a given SEID, AE subsystem 400 may determine exactly what credentials are provisioned on device 100. Therefore, in order to make a device authentication, AE subsystem 400 may work to have device 100 prove that it includes the particular SEID associated with "Credential ABC". In order to achieve this, system 1 may rely on a certificate that has been issued by the secure element manufacturer of secure element 145 of device 100 and may be physically baked into the hardware of device 100 (e.g., such a certificate may have the SEID value in it). A key of or associated with such a certificate may be unique per device and may never change for a given secure element. At operation 506, device 100 may be configured to fetch a nonce from AE subsystem 400 (e.g., as a portion of data 506d) and then perform a digital signature using the private key in the secure element (e.g., for which the public key has been certified by the SE manufacturer) and provide that signed nonce to AE subsystem 400 (e.g., as a portion of data 506d), which AE subsystem 400 may then use to prove that operation 506 is being carried out with device 100 on which AE subsystem 400 lists "Credential ABC" as being already provisioned. In addition to or as an alternative to such device verification of operation 506, operation 506 may include AE subsystem 400 carrying out any suitable user authentication. For example, an authentication token may be delivered to device 100 (e.g., as a portion of data 502d) when device 100 is successfully authenticated with an account of AE subsystem 400, and presentation of such a token (e.g., as a portion of data 506d at operation 506) to AE subsystem 400 on its own or with any suitable additional data (e.g., a timestamp based one-time password (e.g., as communicated at operation 506) or the like) may be received and used by AE subsystem 400 at operation 506 to confirm that the user of device 100 is still properly logged in to AE subsystem 400.

Once AE subsystem 400 is able to verify that device 100 of operation 506 and the current user (e.g., user U1) of device 100 of operation 506 are the same as the device and user already associated at AE subsystem 400 with "Credential ABC" provisioned on device 100 (e.g., an association that may occur at operation 504), then AE subsystem 400 may be configured to proceed with creating (e.g., at sub-operation 506') an ownershipToken for "Credential ABC" as provisioned on device 100. The ownershipToken may be created for the particular device (i.e., device 100) and/or the particular user (i.e., user U1) and/or the particular context. For example, for the AE subsystem account (e.g., in any suitable table 403), AE subsystem 400 may generate an ownership token for the particular "Credential ABC" for the user of device 100 and for the context with which the user/device has proven ownership of the credential. Such context of the ownership token may be indicative of the type of proof of ownership identified at operation 506 for the credential and user/device (e.g., the user verification and/or the device verification carried out at operation 506, one or each of which may be carried out automatically by device 100 and AE subsystem 400 at operation 506 without any user interaction required of the user at device 100 for such verification). Therefore, in such an example of operation 506, the particular context may be "proof of credential possession" due to the credential already being provisioned on device 100 prior to operation 506.

As just one example of the creation an ownershipToken for a particular credential for a particular device for a particular user, a unique user identifier and a unique credential identifier may be obtained and then used to compute the ownership token. For example, a unique user identifier may be any suitable identifier of the verified user (e.g., as may be provided by AE subsystem 400 based on the particular "USER ID" of the AE subsystem account (e.g., as provided by the user at screen 190a)), while a unique credential identifier may be any suitable identifier of the credential for which the ownership token is being generated (e.g., a randomly generated credential identifier that may be based on or may be the credential identifier (e.g., a PAN of the credential or a hash of such a PAN) that may be maintained by AE subsystem 400 in association with device 100 and/or the user (e.g., in table 403)). The ownership token may be computed by performing any suitable function (e.g., cryptographic function) on a combination of such a unique user identifier and such a unique credential identifier, such that the ownership token may bind the user identifier and the credential identifier. As just one example, the ownership token may be a keyed-hash message authentication code or hash-based message authentication code ("HMAC") of the user identifier and the credential identifier by performing an HMAC operation over the user identifier and the credential identifier for generating a random token of a particular length (e.g., 256 bits). Such an ownershipToken may then be stored by AE subsystem 400 against (e.g., in table 403) the context of the provisioning of the credential (e.g., what proof of ownership was used to enable the provisioning of the credential on the device (e.g., for operation 506 with respect to a credential already provisioned on the device prior to generating the ownershipToken, the context may be indicative of "proof of digital credential possession already on device")). Then, after creation and storage of the ownershipToken at operation 506' (e.g., in table 403), operation 506 may also include such an ownershipToken being communicated (e.g., as a portion of data 506d) to device 100, such that device 100 may store the ownershipToken in an AE locker on device 100 (e.g., an iCloud Keychain) that may also be securely stored or otherwise maintained by AE subsystem 400 for the authenticated AE account for enabling AE locker syncing or recovery on other devices that may be able to authenticate properly with that AE account (or on the same device at a later time after the device may delete certain data therefrom). Therefore, after operation 506, device 100 (e.g., storage 173) may include an ownershipToken for "Credential ABC" as provisioned on device 100. Such storage of an ownership token on device 100 may be stored by the device's SEP and may be configured to only be read on device 100. For example, device 100 may be configured such that a user's security passcode for device 100 may be needed in order for an ownership token to be read, thereby requiring an additional authentication factor for the ownership token, even if first and second authentication (e.g., ID/PW and verification code authentication factors) are compromised. Thus, even if an attacker (e.g., a malicious user U2) has possession of user U1's "USER ID" and "PASSWORD" for an AE account and has access to SMS messages of the user's device (e.g., by SIM swapping) and even if the attacker has physical control over one of the user's devices, the attack won't succeed without the user's device security passcode. As described herein (e.g., with respect to operation 512 and/or operation 514), this may enable the ownership token to facilitate secure future provisioning of its associated credential with less friction (e.g., without requiring additional user proof of ownership of the particular credential) such that a user may no longer need to enter the CVV or go through the hassle of passing other AE or CI credential ownership challenges, but instead the additional security may be achieved using the ownership token that uses the user's device security passcode in association with their physical device (and its SEP). Therefore, one or each credential provisioned on device 100 prior to operation 506 may have a respective ownership token created therefor and provided to device 100 at operation 506 (e.g., without the user having to re-provision the credentials on the device and/or without the user having to provide any additional proof of ownership of the credentials such that operation 506 may not provide any additional friction to the user).

Figure 3I:
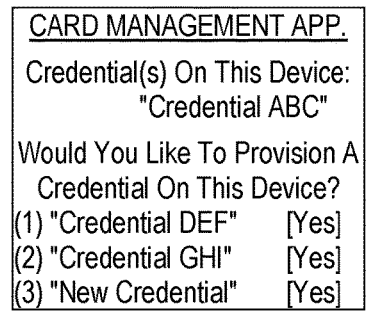

After the device update of operation 506 that may enable device 100 to receive and use ownership tokens, any new credential that is provisioned on device 100 may also be provided with an associated ownershipToken. For example, once device 100 has been authenticated with a user's AE account at operation 502 and once device 100 has been updated to support ownership tokens at operation 506, a credential "Credential DEF" may be provisioned on device 100 at operation 508 through communication of any suitable provisioning data 508d between device 100, AE subsystem 400, and CI subsystem 300. For example, user U1 may interact with a credential management application (e.g., card management application 113b) of device 100 that may be communicatively coupled to AE subsystem 400 for determining what credential to provision on device 100. For example, by interfacing with the GUI of screen 190i of FIG. 3I, user U1 may be provided with (e.g., from AE subsystem 400 (e.g., as a portion of data 508d)) not only a list of credentials already provisioned on device 100 (i.e., "Credential ABC") but also a list of credentials that may be provisioned on device 100, including a "Credential DEF" and a "Credential GHI", each of which may be a credential already on file (e.g., in any suitable table 403) with the AE subsystem for the AE account of the user authenticated at operation 502 but that may not yet be provisioned on device 100, and/or any new credential that may not yet be known by AE subsystem 400 to be associated with the authenticated AE account of the user. In response to being presented with such provisioning options, the user may select a second credential for provisioning on device 100, such as "Credential DEF" (e.g., by selecting [Yes] associated with that credential at screen 190i), which may send any suitable credential provisioning selection data of data 508d from device 100 to AE subsystem 400 to start the provisioning process of "Credential DEF" onto device 100. Because "Credential DEF" may already be known to AE subsystem 400, there may be no need for the user of device 100 to provide certain details about the credential to AE subsystem 400, such as a primary account number ("PAN") and/or PAN expiry date and/or name associated with the credential or other identification data (e.g., unlike if the user were attempting to provision a "New Credential" not yet associated with the user's authenticated AE account). However, if an ownershipToken has not yet been created for "Credential DEF", then system 1 may still require certain proof of ownership of the credential to be provisioned despite the credential already being associated with the user's authenticated AE account. For example, by interfacing with the GUI of screen 190j of FIG. 3J, user U1 may be provided with (e.g., from AE subsystem 400 (e.g., as a portion of data 508d)) a request for certain proof of credential ownership information that AE subsystem 400 and/or CI subsystem 300 may require from the user before AE subsystem 400 and/or CI subsystem 300 will allow the selected "Credential DEF" to be provisioned onto device 100. For example, as shown, screen 190J may request that the user of device 100 enter and submit any suitable "OWNERSHIP PROOF" of the funding account associated with "Credential DEF". Such ownership proof may be any suitable information that may be authenticatable by CI subsystem 300 or otherwise as associated with the credential to be provisioned. Any such request for any such proof of ownership information, whether the user is attempting to provision a credential already known to (e.g., associated with) the authenticated AE subsystem account or a new credential not known to the AE subsystem account, provides a new layer of friction to the user's attempt to provision the credential onto device 100 that may be obviated through use of an ownershipToken associated with the credential (e.g., as described with respect to later operations). However, without use of such an ownershipToken, such a proof of ownership may be required of the user of device 100.

Continuing with operation 508, once the user is able to submit such requested proof of ownership (e.g., through submission at screen 190j of any suitable proof of ownership information with data 508d), AE subsystem 400 and CI subsystem 300 may then work together, additionally at operation 508, to fully provision the credential onto the device 100 as well as to create and share with device 100 an ownershipToken associated with the credential being provisioned (e.g., with any suitable data 508d). For example, by interfacing with the GUI of screen 190k of FIG. 3K, user U1 may be provided with (e.g., from AE subsystem 400 and/or CI subsystem 300 as a portion of data 508d) an indication that "Credential DEF" has been successfully provisioned on device 100. For such a provisioning of "Credential DEF" at operation 508 (e.g., with user friction (e.g., with requiring active user proof of ownership of the specific credential)), any suitable user credential data of data 508d may be provisioned on device 100 by CI subsystem 300 (e.g., by first issuing subsystem 391 or by second issuing subsystem 392), and in some embodiments, via AE subsystem 400 (e.g., via credential protection subsystem 491). For example, such user credential data may be at least partially provisioned on secure element 145 of device 100 directly from CI subsystem 300. Such user credential data may be at least partially provisioned on secure element 145 as at least a portion or all of second credential SSD 154b and may include credential applet 153b with credential information 161b and/or credential key 155b' and/or key 155bk. In some embodiments, such user credential data may also include access key 155b, which may be initially provided from AE subsystem 400 to issuer subsystem 300 and/or may be added by AE subsystem 400. Such user credential data may include any suitable send token (e.g., a send token ST-2a (e.g., a unique identifier associated with an account token (e.g., an account token AT-2a (e.g., an F-PAN)) of the funding account at CI subsystem 300) and that may be used specifically for provisioning a payment credential on a particular user device) as at least a portion of credential information of the payment credential being provisioned (e.g., credential information 161*b* of applet 153*b*), an AID (e.g., AID 155*ba* for applet 153*b* of the data of the payment credential being provisioned at SSD 154*b*), an SSD identifier, and/or an SSD counter. It is to be appreciated that send token ST-2*a* may be considered or otherwise referred to herein as a "virtual" credential or virtual PAN or device PAN ("D-PAN") or send device PAN ("SD-PAN") that may be provisioned on device 100 rather than the user's "actual" credential or actual PAN or funding PAN ("F-PAN") (e.g., account token AT-1*a*). Like "Credential ABC", when "Credential DEF" is provisioned on device 100 of an authenticated AE account, information identifying the credential and the device and the provisioning may be maintained by AE subsystem 400 (e.g., in any suitable table 403) for tracking what credentials are on what devices, although specific data identifying a specific funding account may not be known or stored by the AE subsystem (e.g., only a D-PAN or a hash thereof rather than an actual F-PAN may be maintained by the AE subsystem).

Therefore, the provisioning of "Credential DEF" on device 100 of operation 508 may be similar to the provisioning of "Credential ABC" on device 100 of operation 504, for example, with respect to the additional layer of proof of ownership required of the user (e.g., by the GUI of FIG. 3G and by the GUI of FIG. 3J, respectively), where such a requirement may be enacted by AE subsystem 400 at operation 508 when AE subsystem 400 does not receive from device 100 any valid ownershipToken associated with "Credential DEF" (e.g., with a request for provisioning "Credential DEF"). However, because device 100 is now configured to utilize ownership tokens (e.g., due to the event of operation 506), operation 508 may also include the generation and sharing of an ownership token associated with "Credential DEF" when such an additional layer of proof of ownership of "Credential DEF" is received and determined to be valid. Therefore, once such proper validation of the user and proof of ownership and/or identity necessary to securely provision "Credential DEF" has been successfully achieved, AE subsystem 400 may be configured to generate and share with device 100 an ownershipToken for "Credential DEF" at operation 508 (e.g., such a token may be generated at a sub-operation 508' and shared with device 100 as at least a portion of data 508*d* communicated from AE subsystem 400 to device 100). In order for AE subsystem 400 to generate and share such an ownershipToken, AE subsystem 400 may have already obtained proper identification of device 100 and/or of its current user and/or of the credential being provisioned, such that AE subsystem 400 may be configured to proceed with creating (e.g., at sub-operation 508') an ownershipToken for "Credential DEF" as is being (or recently has been) provisioned on device 100. The ownershipToken may be created for the particular device (i.e., device 100) and/or the particular user (i.e., user U1) and/or the particular context. For example, for the AE subsystem account (e.g., in any suitable table 403), AE subsystem 400 may generate an ownership token for the particular "Credential DEF" for the user of device 100 and for the context with which the user/device has proven ownership of the credential. Such context of the ownership token may be indicative of the type of proof of ownership identified at operation 508 for the credential and user/device (e.g., the user verification and/or the device verification carried out at operation 508 (e.g., the context may be based on what condition was met for the provisioning to go through (e.g., as submitted via the GUI of FIG. 3J), such as proof of PAN and/or CVV and/or AE/CI one time verification code and/or some or all of a social security number and/or scan of an identity document (e.g., driver's license or passport) and/or the like). The ownershipToken for "Credential DEF" as may be generated at operation 508 may be generated similarly to the ownershipToken that may be generated for "Credential ABC" at operation 506, except by using a different credential identifier. Such an ownershipToken may then be stored by AE subsystem 400 against (e.g., in table 403) the context of the provisioning of the credential (e.g., what proof of ownership was used to enable the provisioning of the credential on the device of operation 508). Then, after creation and storage of the ownershipToken at operation 508' (e.g., in table 403), operation 508 may also include such an ownershipToken being communicated (e.g., as a portion of data 508*d*) to device 100, such that device 100 may store the ownershipToken in an AE locker on device 100 (e.g., an iCloud Keychain) that may also be securely stored or otherwise maintained by AE subsystem 400 for the authenticated AE account for enabling AE locker syncing or recovery on other devices that may be able to authenticate properly with that AE account (or on the same device at a later time after the device may delete certain data therefrom). Therefore, after operation 508, device 100 (e.g., storage 173) may also include an ownershipToken for "Credential DEF" as provisioned on device 100. Therefore, one or each credential provisioned on device 100 after operation 506 may have a respective ownership token created therefor and provided to device 100 during or shortly after the provisioning of the credential.

At some point after operation 508, the user of device 100 may come to obtain device 200 and may wish to provision onto device 200 one or some of the credentials that have previously been provisioned on device 100, such as "Credential ABC" as provisioned at operation 504 and/or "Credential DEF" as provisioned at operation 508. In order to avoid the proof of ownership friction endured by the user at operation 504 and/or at operation 508 while still provisioning those credentials on a new device, the ownership tokens associated with those credentials may be securely obtained by device 200 (e.g., as enabled to handle such tokens) through any suitable mechanism(s). For example, at operation 510, any suitable user device data 510*d* (e.g., device registration or authentication data) may be exchanged between second device 200 and AE subsystem 400 (e.g., device protection subsystem 471 and/or credential protection subsystem 491 and/or any suitable subsystem(s) of AE subsystem 400) for initializing, registering, validating, and/or otherwise authenticating device 200 and/or a particular user thereof with AE subsystem 400 in any suitable manner. As mentioned, AE subsystem 400 may be provided by any suitable administration and/or commercial entity that may offer various services to any suitable user of any suitable user device (e.g., user U1 of device 100 and/or of device 200) after any suitable authentication, such as via user-specific log-in information to a user-specific account or group (e.g., family) account with that administration entity (e.g., via a user-specific identifier (e.g., an Apple ID) and password combination (e.g., first factor authentication)), alone or in combination with proof of receipt of a device-specific verification code (e.g., a one-time use SMS verification code (e.g., second factor authentication (e.g., two-factor authentication and/or two-step verification))) and/or in combination with a device-local AE security code (e.g., an iCloud Security Code or user-selected device log-on authentication passcode (e.g., third factor authentication)). Therefore, at operation 510, device 200 may be authenticated with a particular account of user U1 at AE subsystem 400 in any suitable manner.

For example, at operation 510, user U1 of device 200 may authenticate device 200 with a user account at AE subsystem 400 using an online resource on device 200 (e.g., an authentication resource (e.g., DP application 213c) communicatively coupled to AE subsystem 400) that may be configured to facilitate the authentication process. As shown, by interfacing with the GUI of screen 1901 of FIG. 3L, for example, user U1 may enter a "USER ID" (e.g., first user identifier U1-ID) that may be any suitable data that may uniquely identify first user U1 to AE subsystem 400 and any suitable "PASSWORD" (e.g., first user password U1-PW) associated therewith (e.g., user-specific log-in information to a user-specific account with the administration entity (e.g., via a user-specific identification and password combination or the like)), and provide (e.g., submit at screen 1901) that user account ID/PW data (e.g., as a portion of device registration or authentication data 510d) to AE subsystem 400 along with any suitable additional information, including, but not limited to, any device registration identifier(s) or any suitable device registration data, such as a unique electronic device identifier ED2-ID of device 200 (e.g., any unique identifier) assigned to device 200 (e.g., by AE subsystem 400), such as at time of device manufacture and/or at least one social identifier or social token LT-2 (e.g., at least one telephone number and/or e-mail address) associated with device 100 for user 1 (e.g., any suitable device identification information 219), such that the device registration data of device 200 may be associated with user U1's verified specific user account at AE subsystem 400 (e.g., at device protection subsystem 471). For example, storage 273 of device 200 may include first user identifier U1-ID and unique electronic device identifier ED2-ID and social token LT-2 (e.g. in a portion or entry of storage 273), and AE table 403 may be updated at operation 510 by storing unique electronic device identifier ED2-ID and/or social token LT-2 of device 200 against the verified user account data of user U1 (e.g., first user identifier U1-ID and/or first user password data U1-PW), for example, by linking such data with any suitable data link(s) in a linked data entry of AE table 403. AE subsystem 400 may be operative to validate any or all of the device registration data communicated by device 200 (e.g., unique electronic device identifier ED2-ID and/or social token LT-2) in any suitable manner prior to linking or authenticating that device registration data with a verified user account at device protection subsystem 471. Additionally, at operation 510, user U1 of device 200 may further log into or authenticate its account at AE subsystem 400 (e.g., using an online resource on device 200 (e.g., an authentication resource (e.g., DP application 213c))) through an additional authentication factor. For example, by interfacing with the GUI of screen 190m of FIG. 3M, user U1 may be provided with (e.g., from AE subsystem 400 via any suitable communication mechanism (e.g., SMS to device 200) as a portion of data 510d) a "VERIFICATION CODE" of any suitable (e.g., unique, one-time) value (e.g., a six-digit alphanumeric verification code). Additionally, at operation 510, user U1 of device 200 may further log into or authenticate its account at AE subsystem 400 (e.g., using an online resource on device 200 (e.g., an authentication resource (e.g., DP application 213c))) through completing such an additional authentication factor. For example, by interfacing with the GUI of screen 190n of FIG. 3N, user U1 may enter such a received "VERIFICATION CODE" and provide (e.g., submit at screen 190n) that verification code data and any other suitable data (e.g., device identification data) to AE subsystem 400 (e.g., as a portion of data 510d) for enabling AE subsystem 400 to authenticate this additional authentication factor of operation 510. Additionally, at operation 510, user U1 of device 200 may further log into or authenticate its account at AE subsystem 400 (e.g., using an online resource on device 200 (e.g., an authentication resource (e.g., DP application 213c))) through yet an additional authentication factor. For example, by interfacing with the GUI of screen 190o of FIG. 3O, user U1 may enter an "AE SECURITY CODE" (e.g., a passcode local to the device that may be used to unlock the device or a service thereof, where the passcode may not be known by AE subsystem 400 but where the passcode may be proven to AE subsystem 400 to be known by a user of the device (e.g., via any suitable SRP or PAKE or the like)) and the entry of a correct (or incorrect) AE SECURITY CODE by the user (e.g., through submit at screen 190o) may enable the device to automatically communicate any suitable data (e.g., as a portion of data 510d) to AE subsystem 400 that may enable AE subsystem 400 to determine whether (or not) the passcode was properly entered by the user in order to determine whether or not to authenticate this additional authentication factor of operation 510. If such an AE SECURITY CODE is properly entered by the user at screen 190o and such proper entry may be determined by AE subsystem 400 (e.g., without AE subsystem 400 receiving or storing or otherwise handling the security code itself (e.g., a code that may never leave storage of device 200)), then, additionally, at operation 510, AE subsystem 400 may communicate any appropriate data 510d to device 200 for indicating to the user of device 200 that an AE locker of the user's AE account with AE subsystem 400 has been or may be successfully accessed on device 200. For example, by interfacing with the GUI of screen 190p of FIG. 3P, user U1 may be provided with (e.g., from AE subsystem 400 as a portion of data 510d) an indication that an AE locker of the user's AE account with AE subsystem 400 has been or may be successfully accessed on device 200. Such an authentication process of operation 510 (e.g., a successful three factor authentication process) may enable device 200 to sync or recover or otherwise access or update any suitable AE locker items of the accessed AE locker (e.g., passwords, private keys, certificates, tokens (e.g., ownershipTokens for more efficient (e.g., less friction) credential provisioning), secure notes, etc.). In some embodiments, operation 510 may include presenting the "VERIFICATION CODE" on device 100 rather than device 200 (e.g., by presenting a GUI similar to that of FIG. 3B on device 100 rather than by presenting the GUI of FIG. 3M on device 200), where proper entry and submission of that "VERIFICATION CODE" from device 100 using device 200 (e.g., via the GUI of FIG. 3N on device 200) may prove that the user of device 200 also has current ownership of device 100, which may, in some instances, obviate the need for the user to enter any "AE SECURITY CODE" at operation 510 (e.g., at the GUI of FIG. 3O). Alternatively, if the user does not currently have possession of device 100 at operation 510, and the "VERIFICATION CODE" is presented to and submitted by device 200 (e.g., at the GUIs of FIGS. 3M and 3N), then the user may be required to enter an "AE SECURITY CODE" at operation 510 (e.g., at the GUI of FIG. 3O), where such an "AE SECURITY CODE" may be the same code used at operation 502 (e.g., the passcode associated with device 100). Any suitable authentication (e.g., a successful three factor authentication process) at operation 510 of device 200 with such an AE user account with AE subsystem 400 that was also authenticated at operation 502 and used during operations 504-508 may enable device 200 (e.g., at sub-operation 510') to sync or recover or otherwise access or update any suitable AE locker items of an AE locker of the account (e.g., passwords, private keys, certificates, tokens (e.g., ownershipTokens for more efficient (e.g., less friction) credential provisioning), secure notes, etc.).

For example, when a user may enable an AE locker for the first time, the AE and system may be configured such that the device may establish a circle of trust and create a syncing identity for itself. The syncing identity may include a private key and a public key. The public key of the syncing identity may be put in the circle, and the circle may be signed twice: first by the private key of the syncing identity, then again with an asymmetric elliptical key (e.g., using P-256) derived from the user's AE account PW. Also stored with the circle may be the parameters (e.g., random salt and iterations) that may be used to create the key that is based on the user's AE account PW. The signed syncing circle may be placed in the user's AE key value storage area, which may be configured not to be read without knowing the user's AE PW, and it may be configured not to be modified validly without having the private key of the syncing identity of its member. When the user turns on an AE locker on another device, it may be configured to notice that the user has a previously established syncing circle with the AE that it is not a member of. The device may be configured to automatically create its syncing identity key pair, then create an application ticket to request membership in the circle. The ticket may include the device's public key of its syncing identity, and the user may be asked to authenticate with their AE PW (see, e.g., FIG. 3L). The elliptical key generation parameters may be retrieved from the AE and may generate a key that may be used to sign the application ticket. Finally, the application ticket may be placed in the AE (e.g., in table 403). When the first device sees that an application ticket has arrived, it may display a notice for the user to acknowledge that a new device is asking to join the syncing circle. The user may enter their AE PW, and the application ticket may be verified as signed by a matching private key. This may establish that the person who generated the request to join the circle entered the user's AE PW at the time the request was made. Upon the user's approval to add the new device to the circle, the first device may add the public key of the new member to the syncing circle, sign it again with both its syncing identity and the key derived from the user's AE PW. The new syncing circle may be placed in the AE (e.g., in table 403), where it may similarly be signed by the new member of the circle. Thus, there may now be two members of the signing circle, and each member may have the public key of its peer. They now may begin to exchange individual locker items via AE key value storage or store them in AE as appropriate. If both circle members have the same item, the one with the most recent modification date may be synced. Items may be skipped if the other member has the item and the modification dates are identical. Each item that is synced may be encrypted so it can be decrypted only by a device within the user's circle of trust and/or so that it cannot be decrypted by any other devices or by the AE. This process may be repeated as new devices join the syncing circle.

The AE and system may be configured to provide AE locker recovery that may provide a way for users to optionally escrow their AE locker items with the AE, without allowing the AE to read the passwords and other data the AE locker may contain. Even if the user has only a single device, AE locker recovery may provide a safety net against data loss. A cornerstone of AE locker recovery may be secondary authentication and a secure escrow service, created and/or provided by the AE specifically to support this feature. The user's AE locker may be encrypted using a strong passcode, and the escrow service may provide a copy of the AE locker only if a strict set of conditions are met. When AE locker is turned on, if two-factor authentication is enabled for the user's account, the device passcode may be used to recover an escrowed AE locker. If two-factor authentication is not set up, the user may be asked to create an AE Security Code by providing a passcode (e.g., a six-digit passcode). Alternatively, without two-factor authentication, users can specify their own longer code, or let their devices create a cryptographically random code that they can record and keep on their own. Next, the device may export a copy of the user's AE locker, encrypt it wrapped with keys in an asymmetric lockerbag (e.g., keybag), and place it in the user's AE key value storage area. The keybag may be wrapped with the user's AE Security Code and the public key of the hardware security module ("HSM") cluster that may store the escrow record. This may become the user's AE Escrow Record (e.g., a portion of table 403). If the user decides to accept a cryptographically random security code, instead of specifying their own or using a four-digit value, no escrow record may be necessary. Instead, the AE Security Code may be used to wrap the random key directly. In addition to establishing a security code, users may register a phone number or other communication channel with a device. This may provide a secondary level of authentication during AE locker recovery. The user will receive an SMS or other communication that may be replied to in order for the recovery to proceed.

The AE and system may be configured to provide a secure infrastructure for AE locker escrow that may ensure only authorized users and devices can perform a recovery. Topographically positioned behind the AE locker may be HSM clusters that may be configured to guard the escrow records. Each may have a key that may be used to encrypt the escrow records under their watch. To recover an AE locker, users may be required to authenticate with their AE account ID and PW and respond to an SMS or other suitable VERIFICATION CODE sent to their registered phone number or other communication mechanism. After this is done, users may be required to enter their AE Security Code or other suitable passcode. The HSM cluster may be configured to verify that a user knows such an AE Security Code using a Secure Remote Password ("SRP") protocol or other suitable protocol, while the code itself may not be sent to the AE subsystem. Each member of the cluster may be configured to independently verify that the user has not exceeded the maximum number of attempts allowed to retrieve their record (e.g., entered too many incorrect passcodes). If a majority agree, the cluster may be configured to unwrap the escrow record and send it to the user's device. Next, the device may be configured to use the AE Security Code or other suitable passcode to unwrap the random key used to encrypt the user's AE locker. With that key, the AE locker, as retrieved from the AE locker key value storage, may be decrypted and restored onto the device (e.g., such that any ownership token available to device 100 at operation 510 may now also be available to device 200).

The AE and system may be configured such that only a limited number (e.g., 10) of attempts to authenticate and retrieve an escrow record may be allowed. After several failed attempts, the record may be locked and/or the HSM cluster may be configured to destroy the escrow record and the AE locker may be lost forever. This may provide protection against a brute-force attempt to retrieve the record, at the expense of sacrificing the AE locker data in response. These policies may be coded in the HSM firmware.

Once a device has been authenticated to some degree with a user's AE account, one or more credentials may be provisioned on the device. For example, once device 200 has been authenticated with a user's AE account at operation 510, a credential "Credential ABC" may be provisioned on device 200 at operation 512 through communication of any suitable provisioning data 512d between device 200, AE subsystem 400, and CI subsystem 300. For example, user U1 may interact with a credential management application (e.g., card management application 213b) of device 200 that may be communicatively coupled to AE subsystem 400 for determining what credential to provision on device 200. For example, by interfacing with the GUI of screen 190q of FIG. 3Q, user U1 may be provided with (e.g., from AE subsystem 400 (e.g., as a portion of data 512d)) a list of credentials that may be provisioned on device 200, including a "Credential ABC" and a "Credential DEF" and a "Credential GHI", each of which may be a credential already on file (e.g., in any suitable table 403) with the AE subsystem for the AE account of the user authenticated at operation 510 (e.g., credit cards, debit cards, stored value cards, and/or any other suitable credentials that may be known and already authenticated to the user's account at AE subsystem 400 (e.g., as may have been used in the past to pay for media or applications from store 420) and/or that may have been previously provisioned on a device associated with the AE account (e.g., "Credential ABC" at operation 502 and "Credential DEF" at operation 508)), and/or any new credential that may not yet be known by AE subsystem 400 to be associated with the authenticated AE account of the user. In response to being presented with such provisioning options, the user may select a first credential for provisioning on device 200, such as "Credential ABC" (e.g., by selecting [Yes] associated with that credential at screen 190q), which may send any suitable credential provisioning selection data of data 512d from device 200 to AE subsystem 400 to start the provisioning process of "Credential ABC" onto device 200. Because an ownershipToken associated with "Credential ABC" as previously provisioned on device 100 may be available to device 200 (e.g., due to operation 510), such credential provisioning selection data of data 512d from device 200 to AE subsystem 400 may include proof of such an ownershipToken.

When provided with an ownershipToken from electronic device 200 with a request to provision a credential on the electronic device (e.g., as a portion of data 512d at operation 512), AE subsystem 400 may be configured to automatically attempt to validate that ownershipToken (e.g., at sub-operation 512'), such that, if validated, the credential may be automatically provisioned on device 200 without any additional friction to the user (e.g., without requiring proof of ownership of "Credential ABC" by the user of device 200 (e.g., as was done by the GUI of FIG. 3G for the user of device 100 at operation 504)). For example, at operation 512', AE subsystem 400 may attempt to validate that the provided ownershipToken is valid and that it is associated with (e.g., belongs to or was created by a unique identifier of) the same user that provided the ownershipToken to AE subsystem 400. For example, when an ownershipToken is presented to AE subsystem 400 by a user logged on device 200, AE subsystem 400 may attempt to confirm that the ownershipToken was not somehow stolen from another user. Therefore, along with such an ownershipToken, device 200 may automatically present to AE subsystem 400 an authentication token that may allow AE subsystem 400 to identify the user currently logged-into device 200 (e.g., as authenticated at operation 510) and to make sure that user is properly logged in on device 200. If AE subsystem 400 is able to validate such an authentication token, a unique user identifier associated with that authentication token may be accessed by AE subsystem 400 and, then, AE subsystem 400 may use that accessed unique user identifier to validate the ownershipToken provided by device 200 (e.g., by attempting to recreate the same ownershipToken as received using the accessed unique user identifier and unique identifier information for the credential to be provisioned on device 200 (e.g., using HMAC (or CMAC) or whatever may also have been used to generate the original ownershipToken (e.g., at operation 506')) or by determining if the same ownershipToken as received is stored at AE subsystem 400 (e.g., in table 403) against the accessed unique user identifier (e.g., as may have been stored when the original ownershipToken was generated (e.g., at operation 506')) and/or in any other suitable manner). If the ownershipToken provided by device 200 at operation 512 may be validated at operation 512', then AE subsystem 400 may be configured to automatically allow "Credential ABC" to be provisioned on device 200 without any further user friction. For example, AE subsystem 400 and CI subsystem 300 may then work together, additionally at operation 512, to fully provision the credential onto the device 200 (e.g., with any suitable data 512d). For example, by interfacing with the GUI of screen 190r of FIG. 3R, user U1 may be provided with (e.g., from AE subsystem 400 and/or CI subsystem 300 as a portion of data 512d) an indication that "Credential ABC" has been successfully provisioned on device 200 (e.g., without first requiring similar friction to the GUI of FIG. 3G during similar provisioning of the credential on device 100 (e.g., without the use of any ownershipToken)). For such a provisioning of "Credential ABC" at operation 512 (e.g., without user friction (e.g., without requiring active user proof of ownership of the specific credential)), any suitable user credential data of data 512d may be provisioned on device 200 by CI subsystem 300, in some embodiments, via AE subsystem 400 (e.g., via credential protection subsystem 491). Therefore, AE subsystem 400 may be configured to validate an ownershipToken for a particular credential to be provisioned on a particular device for a particular user and, if successful, may then automatically work with CI subsystem 300 to carry out the provisioning without any additional friction to the user (e.g., any friction beyond the GUI of FIG. 3Q). The fact that the requesting device (e.g., device 200) was able to present a valid ownership token for a credential may implicitly prove to AE subsystem 400 that the requesting device has successfully recovered the AE locker (e.g., iCloud Keychain).

In some embodiments, the context associated with an ownershipToken that is validated during a provisioning request (e.g., at operation 512') may be used to provide certain information to any suitable fraud engine (e.g., fraud system component 480) for any suitable purpose, such as to assess whether certain measures should be taken to increase the confidence of the relationship between the new device and the credential to be provisioned (e.g., based on length of time that the ownershipToken has existed).

After operation 512, a credential "Credential DEF" may be provisioned on device 200 at operation 514 through communication of any suitable provisioning data 514d between device 200, AE subsystem 400, and CI subsystem 300. For example, user U1 may interact with a credential management application (e.g., card management application 213b) of device 200 that may be communicatively coupled to AE subsystem 400 for determining what credential to provision on device 200. For example, by interfacing with the GUI of screen 190s of FIG. 3S, user U1 may be provided with (e.g., from AE subsystem 400 (e.g., as a portion of data 514d)) not only a list of credentials already provisioned on device 200 (i.e., "Credential ABC" (e.g., at operation 512)) but also a list of credentials that may be provisioned on device 200, including a "Credential DEF" and a "Credential GHI", each of which may be a credential already on file (e.g., in any suitable table 403) with the AE subsystem for the AE account of the user authenticated at operation 510 but that may not yet be provisioned on device 200, and/or any new credential that may not yet be known by AE subsystem 400 to be associated with the authenticated AE account of the user. In response to being presented with such provisioning options, the user may select a second credential for provisioning on device 200, such as "Credential DEF" (e.g., by selecting [Yes] associated with that credential at screen 190s), which may send any suitable credential provisioning selection data of data 514d from device 200 to AE subsystem 400 to start the provisioning process of "Credential DEF" onto device 200, where such credential provisioning selection data of data 514d may include data indicative of an ownershipToken associated with "Credential DEF" (e.g., similarly to the ownershipToken sent from device 200 at operation 512 with respect to "Credential ABC"). Then, similarly to sub-operation 512', sub-operation 514' may attempt to validate such an ownershipToken such that "Credential DEF" may be provisioned on device 200 without any further friction to the user. For example, by interfacing with the GUI of screen 190t of FIG. 3T, user U1 may be provided with (e.g., from AE subsystem 400 and/or CI subsystem 300 as a portion of data 514d) an indication that "Credential DEF" has been successfully provisioned on device 200 (e.g., without first requiring similar friction to the GUI of FIG. 3J during similar provisioning of the credential on device 100 (e.g., without the use of any ownershipToken)). For such a provisioning of "Credential DEF" at operation 514 (e.g., without user friction (e.g., without requiring active user proof of ownership of the specific credential)), any suitable user credential data of data 514d may be provisioned on device 200 by CI subsystem 300, in some embodiments, via AE subsystem 400 (e.g., via credential protection subsystem 491). Therefore, AE subsystem 400 may be configured to validate an ownershipToken for a particular credential to be provisioned on a particular device for a particular user and, if successful, may then automatically work with CI subsystem 300 to carry out the provisioning without any additional friction to the user (e.g., any friction beyond the GUI of FIG. 3S).

After operation 514, a credential "Credential GHI" may be provisioned on device 200 at operation 516 through communication of any suitable provisioning data 516d between device 200, AE subsystem 400, and CI subsystem 300. For example, user U1 may interact with a credential management application (e.g., card management application 213b) of device 200 that may be communicatively coupled to AE subsystem 400 for determining what credential to provision on device 200. For example, by interfacing with the GUI of screen 190u of FIG. 3U, user U1 may be provided with (e.g., from AE subsystem 400 (e.g., as a portion of data 516d)) not only a list of credentials already provisioned on device 200 (i.e., "Credential ABC" (e.g., at operation 512) and "Credential DEF" (e.g., at operation 514)) but also a list of credentials that may be provisioned on device 200, including a "Credential GHI", which may be a credential already on file (e.g., in any suitable table 403) with the AE subsystem for the AE account of the user authenticated at operation 510 but that may not yet be provisioned on device 200, and/or any new credential that may not yet be known by AE subsystem 400 to be associated with the authenticated AE account of the user. In response to being presented with such provisioning options, the user may select a second credential for provisioning on device 200, such as "Credential GHI" (e.g., by selecting [Yes] associated with that credential at screen 190u), which may send any suitable credential provisioning selection data of data 516d from device 200 to AE subsystem 400 to start the provisioning process of "Credential GHI" onto device 200, where such credential provisioning selection data of data 516d may not include data indicative of an ownershipToken associated with "Credential GHI" (e.g., due to such a credential not having been provisioned on device 100 or otherwise for the authenticated AE account). Therefore, similarly to operation 508 (including sub-operation 508') with respect to provisioning "Credential DEF" on device 100, operation 516 (including sub-operation 516') with respect to provisioning "Credential GHI" on device 200 may include requiring further proof of ownership of the credential to be provisioned (see, e.g., screen 190v of the GUI of FIG. 3V) before "Credential GHI" may be provisioned on device 200 and an associated ownershipToken may be generated and shared with device 200 and, in some embodiments, the associated AE locker. Then, screen 190w of the GUI of FIG. 3W may be presented indicating that "Credential GHI" has been successfully provisioned before screen 190x of the GUI of FIG. 3X may be presented for enabling the provisioning of yet another credential on device 200.

It is understood that the operations shown in process 500 of FIG. 5 are only illustrative and that existing operations may be modified or omitted, additional operations may be added, and the order of certain operations may be altered. Further, in some implementations, two or more operations may occur in parallel or in a different sequence than described. It is to be understood that references to first user U1 and second user U2 may be made for reasons of clarity and not of limitation. For example, in some embodiments, user U1 and user U2 may be the same user using both first device 100 and/or second device 200. Additionally or alternatively, it is to be understood that references to first device 100 and second device 200 may be made for reasons of clarity and not of limitation. For example, in some embodiments, first device 100 and second device 200 may be the same device (e.g., where the first device may have certain data cleared or a user may log-out or otherwise change any suitable configuration (e.g., between operation 508 and operation 510).

Figure 6:
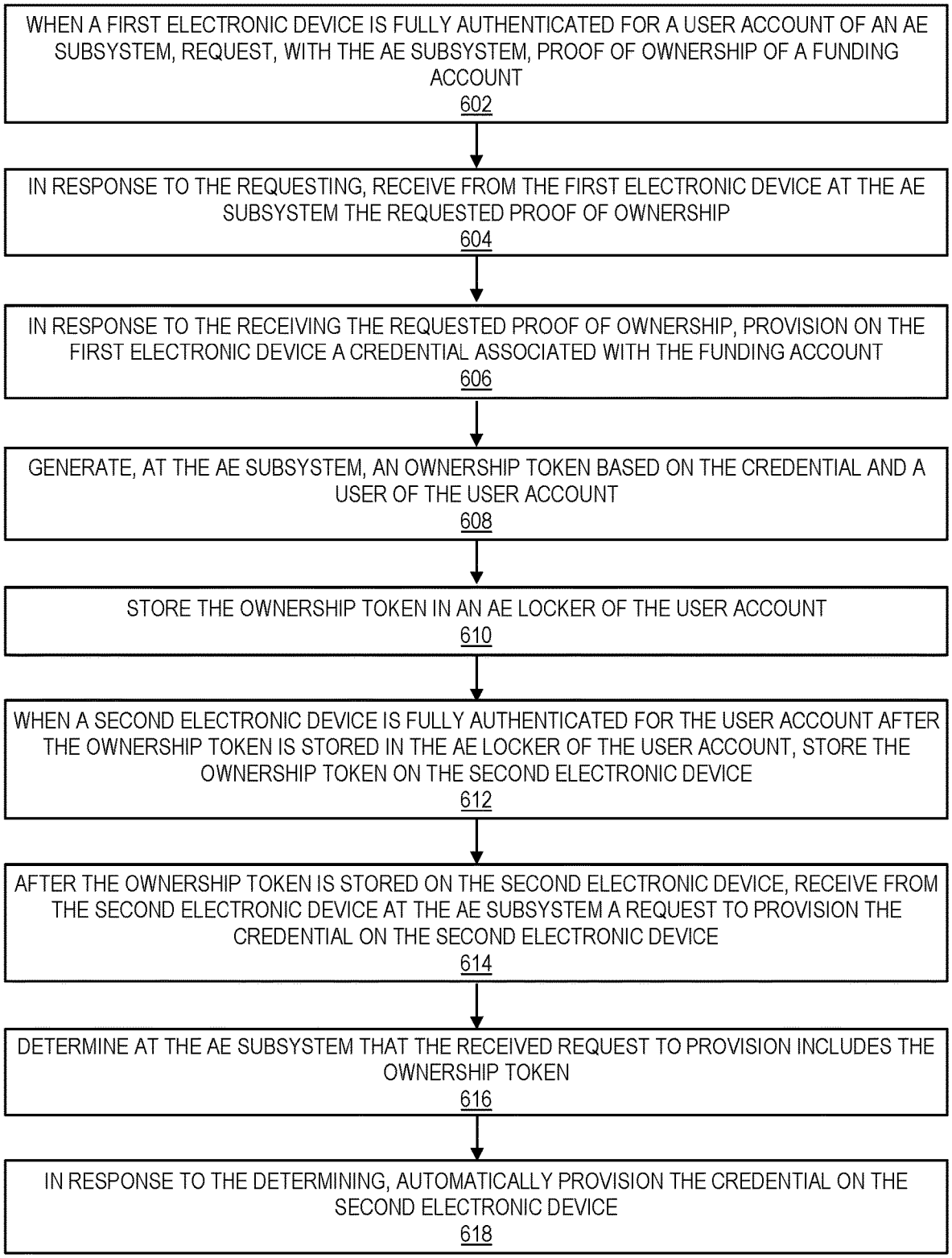

Description of FIG. 6

FIG. 6 is a flowchart of an illustrative process 600 for increasing the efficiency of credential provisioning using an AE subsystem. At operation 602 of process 600, when a first electronic device is fully authenticated for a user account of the AE subsystem, the AE subsystem may request proof of ownership of a funding account (e.g., as described with respect to operation 508 of process 500). In response to the requesting of operation 602, the AE subsystem may receive from the first electronic device the requested proof of ownership at operation 604 (e.g., as described with respect to operation 508 of process 500). In response to the receiving of operation 604, the AE subsystem may provision on the first electronic device a credential associated with the funding account at operation 606 (e.g., as described with respect to operation 508 of process 500), the AE subsystem may generate an ownership token based on the credential and a user of the user account at operation 608 (e.g., as described with respect to operation 508' of process 500), and the AE subsystem may store the ownership token in an AE locker of the user account at operation 610 (e.g., as described with respect to operation 508 of process 500). After the storing the ownership token in the AE locker of the user account at operation 610, when a second electronic device is fully authenticated for the user account, the AE subsystem may store the ownership token on the second electronic device at operation 612 (e.g., as described with respect to operation 510 of process 500). After the storing of operation 612, the AE subsystem may receive from the second electronic device a request to provision the credential on the second electronic device at operation 614 (e.g., as described with respect to operation 514 of process 500), the AE subsystem may determine that the received request to provision includes the ownership token at operation 616 (e.g., as described with respect to operation 514' of process 500), and, in response to the determining of operation 616, the AE subsystem may automatically provision on the second electronic device the credential at operation 618 (e.g., as described with respect to operation 514 of process 500).

It is understood that the operations shown in process 600 of FIG. 6 are only illustrative and that existing operations may be modified or omitted, additional operations may be added, and the order of certain operations may be altered.

Figure 7:
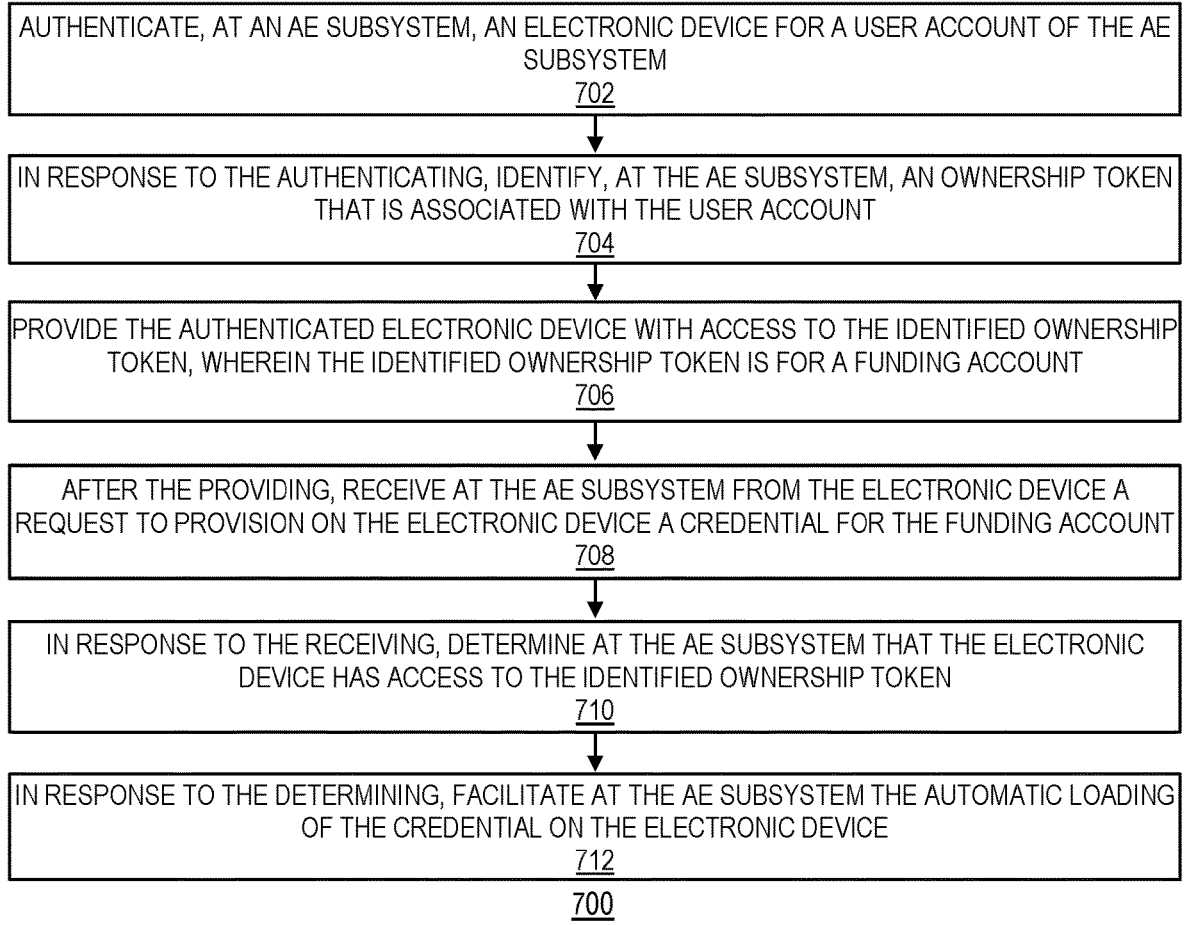

Description of FIG. 7

FIG. 7 is a flowchart of an illustrative process 700 for credential provisioning using an AE subsystem. At operation 702 of process 700, the AE subsystem may authenticate an electronic device for a user account of the AE subsystem (e.g., as described with respect to operation 510 of process 500). In response to the authenticating of operation 702, the AE subsystem may identify an ownership token that is associated with the user account at operation 704 (e.g., as described with respect to operation 510' of process 500). In response to the identifying of operation 704, the AE subsystem may provide the authenticated electronic device with access to the identified ownership token at operation 706 (e.g., as described with respect to operation 510 of process 500), wherein the identified ownership token is for a funding account. After the providing of operation 706, the AE subsystem may receive from the electronic device a request to provision on the electronic device a credential for the funding account at operation 708 (e.g., as described with respect to operation 512 of process 500). In response to the receiving of operation 708, the AE subsystem may determine that the electronic device has access to the identified ownership token at operation 710 (e.g., as described with respect to operation 512' of process 500). In response to the determining of operation 710, the AE subsystem may facilitate the automatic loading of the credential on the electronic device at operation 712 (e.g., as described with respect to operation 512 of process 500).

It is understood that the operations shown in process 700 of FIG. 7 are only illustrative and that existing operations may be modified or omitted, additional operations may be added, and the order of certain operations may be altered.

Figure 8:
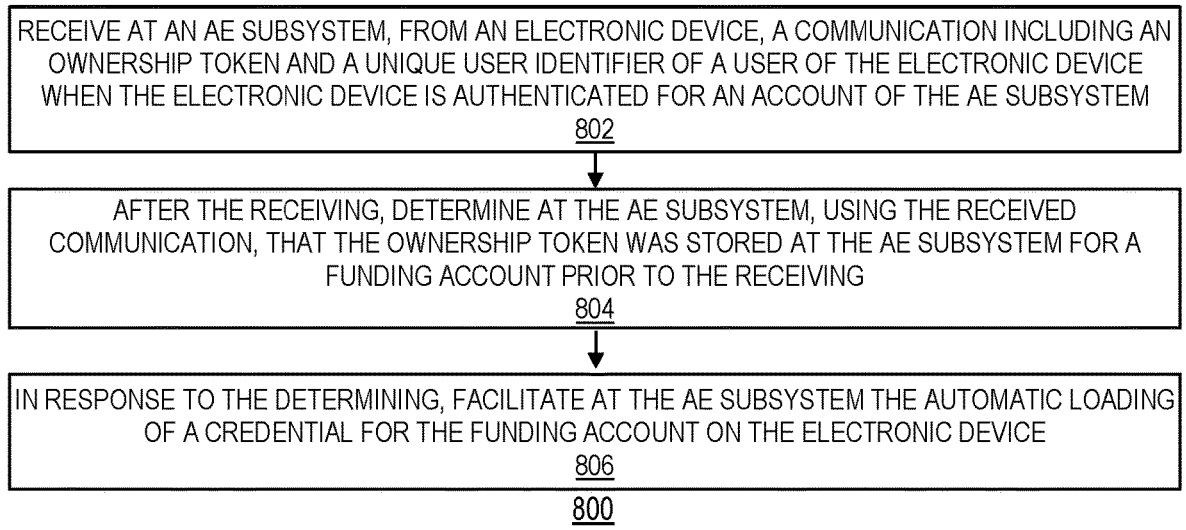

Description of FIG. 8

FIG. 8 is a flowchart of an illustrative process 800 for credential provisioning using an AE subsystem. At operation 802 of process 800, the AE subsystem may receive, from an electronic device, a communication that includes an ownership token and a unique user identifier of a user of the electronic device when the electronic device is authenticated for an account of the AE subsystem (e.g., as described with respect to operation 512 of process 500). After the receiving of operation 802, the AE subsystem may determine at operation 804, using the received communication, that the ownership token was stored at the AE subsystem for a funding account prior to the receiving (e.g., as described with respect to operation 512' of process 500). In response to the determining of operation 804, the AE subsystem may facilitate the automatic loading on the electronic device of a credential for the funding account at operation 806 (e.g., as described with respect to operation 512 of process 500).

It is understood that the operations shown in process 800 of FIG. 8 are only illustrative and that existing operations may be modified or omitted, additional operations may be added, and the order of certain operations may be altered.

Further Description of FIGS. 1-8

Therefore, process 500, process 600, process 700, process 800, and/or any other suitable process described herein may manage special "frictionless tokens" (e.g., ownership tokens) that may be generated for each existing credential in a user's digital wallet. Such tokens may be stored in a user's AE locker (e.g., iCloud keychain) and synchronized across the user's devices using any suitable security features (e.g., using any suitable SEP-based encryption). Such a token, as may be stored in a device's SEP may be configured only to be read on that physical device, and not even an AE subsystem may be able to read such data, such that a user's AE security code or other suitable passcode for one of the devices may be required to read the token, which may add an additional authentication factor so that security is preserved even if other authentication (e.g., a 2-factor authentication) is compromised. Thus, even if an attacker has a user's AE USER ID and AE PASSWORD as well as access to the user's SMS messages (e.g., by SIM swapping) and even if the attacker has physical control over one of the user's devices, the attack won't succeed without the user's AE security passcode or device passcode. This may be described herein as "frictionless" because the user may no longer need to provide further proof of ownership of a credential or be hassled by passing any other AE/CI challenge, but, instead, the additional security may be achieved using the token which may use the user's AE or device passcode in association with the user's physical device (and its SEP). The processes may utilize AE locker (e.g., keychain) sync across various devices through an AE subsystem, which may be assured by SEP, and/or AE or device passcode as an additional (e.g., third) factor, and/or using existing credentials in a digital wallet, and/or may not rely on biometrics but instead multiple levels of passwords/passcodes and physical device access as authentication factors.

One, some, or all of the processes described with respect to FIGS. 1-8 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device or subsystem to another electronic device or subsystem using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120 and/or any or each module of an NFC component of device 200) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As described above, one aspect of the present technology is the gathering and use of data available from specific and legitimate sources to improve the delivery to users of credentials or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, such as current location of device 100 and/or device 200, can be used to the benefit of users. For example, the personal information data can be used to authenticate a user and/or a device and/or a credential, and/or to provide better security and risk assessment for a potential provisioning of a credential. Accordingly, use of such personal information data enables calculated security for provisioned credentials and/or for users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the United States, collection of or access to certain health data may be governed by federal and/or state laws, such as the Health Insurance Portability and Accountability Act ("HIPAA"); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of credential provisioning services, the present technology can be configured to allow users to select to "opt in" or "opt out" of participation in the collection of personal information data during registration for services or anytime thereafter. In another example, users can select not to provide certain data (e.g., location data) for certain services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the credential provisioning services.

Further Applications of Described Concepts

While there have been described systems, methods, and computer-readable media for facilitating frictionless credential provisioning on a user electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for provisioning credentials to computing devices, the method comprising, at an administration entity (AE) subsystem:
    authenticating a first login by a first computing device that is performed using a user account that is known to the AE subsystem;
    receiving, from the first computing device, a proof of ownership of a funding account;
    provisioning, to the first computing device, a credential associated with the funding account that enables the first computing device to perform transactions using the funding account;
    generating an ownership token based on the credential and the user account;
    in response to authenticating a second login by a second computing device that is also performed using the user account:
        automatically providing the ownership token to the second computing device to enable the second computing device to issue a request to provision the credential to the second computing device, wherein the request includes the ownership token; and
    in response to receiving the request from the second computing device:
        authenticating, based on the inclusion of the ownership token in the request, that the second computing device is authorized to receive the credential, and
        provisioning the credential to the second computing device to enable the second computing device to perform transactions using the funding account.

2. The method of claim 1, wherein generating the ownership token comprises performing a cryptographic hash function on a combination of a unique credential identifier of the credential and a unique user identifier of a user of the first computing device when the first computing device is fully authenticated for the user account.

3. The method of claim 1, further comprising, in response to the receiving the proof of ownership:
    storing the ownership token against data indicative of a type of the proof of ownership.

4. The method of claim 3, further comprising, prior to provisioning the credential to the second computing device:
    assessing potential fraud using the data indicative of the type of the proof of ownership.

5. The method of claim 1, wherein the first computing device is distinct from the second computing device.

6. The method of claim 1, wherein the proof of ownership comprises data indicative of information entered on the first computing device by a user of the first computing device in conjunction with authenticating the user account.

7. The method of claim 1, wherein the proof of ownership comprises at least one of:
- a primary account number;
- a card verification value; or
- a one-time verification code generated by a credential issuer.

8. A non-transitory computer readable storage medium configured to store instructions that, when executed by an administration entity (AE) subsystem, cause the AE subsystem to provision credentials to computing devices, by carrying out steps that include:
- authenticating a first login by a first computing device that is performed using a user account that is known to the AE subsystem;
- receiving, from the first computing device, a proof of ownership of a funding account;
- provisioning, to the first computing device, a credential associated with the funding account that enables the first computing device to perform transactions using the funding account;
- generating an ownership token based on the credential and the user account;
- in response to authenticating a second login by a second computing device that is also performed using the user account:
  - automatically providing the ownership token to the second computing device to enable the second computing device to issue a request to provision the credential to the second computing device, wherein the request includes the ownership token; and
- in response to receiving the request from the second computing device:
  - authenticating, based on the inclusion of the ownership token in the request, that the second computing device is authorized to receive the credential, and
  - provisioning the credential to the second computing device to enable the second computing device to perform transactions using the funding account.

9. The non-transitory computer readable storage medium of claim 8, wherein generating the ownership token comprises performing a cryptographic hash function on a combination of a unique credential identifier of the credential and a unique user identifier of a user of the first computing device when the first computing device is fully authenticated for the user account.

10. The non-transitory computer readable storage medium of claim 8, wherein the steps further include, in response to the receiving the proof of ownership:
- storing the ownership token against data indicative of a type of the proof of ownership.

11. The non-transitory computer readable storage medium of claim 10, wherein the steps further include, prior to provisioning the credential to the second computing device:
- assessing potential fraud using the data indicative of the type of the proof of ownership.

12. The non-transitory computer readable storage medium of claim 8, wherein the first computing device is distinct from the second computing device.

13. The non-transitory computer readable storage medium of claim 8, wherein the proof of ownership comprises data indicative of information entered on the first computing device by a user of the first computing device in conjunction with authenticating the user account.

14. The non-transitory computer readable storage medium of claim 8, wherein the proof of ownership comprises at least one of:
- a primary account number;
- a card verification value; or
- a one-time verification code generated by a credential issuer.

15. An administration entity (AE) subsystem configured to provision credentials to computing devices by carrying out steps that include:
- authenticating a first login by a first computing device that is performed using a user account that is known to the AE subsystem;
- receiving, from the first computing device, a proof of ownership of a funding account;
- provisioning, to the first computing device, a credential associated with the funding account that enables the first computing device to perform transactions using the funding account;
- generating an ownership token based on the credential and the user account;
- in response to authenticating a second login by a second computing device that is also performed using the user account:
  - automatically providing the ownership token to the second computing device to enable the second computing device to issue a request to provision the credential to the second computing device, wherein the request includes the ownership token; and
- in response to receiving the request from the second computing device:
  - authenticating, based on the inclusion of the ownership token in the request, that the second computing device is authorized to receive the credential, and
  - provisioning the credential to the second computing device to enable the second computing device to perform transactions using the funding account.

16. The AE subsystem of claim 15, wherein generating the ownership token comprises performing a cryptographic hash function on a combination of a unique credential identifier of the credential and a unique user identifier of a user of the first computing device when the first computing device is fully authenticated for the user account.

17. The AE subsystem of claim 15, wherein the steps further include, in response to the receiving the proof of ownership:
- storing the ownership token against data indicative of a type of the proof of ownership.

18. The AE subsystem of claim 17, wherein the steps further include, prior to provisioning the credential to the second computing device:
- assessing potential fraud using the data indicative of the type of the proof of ownership.

19. The AE subsystem of claim 15, wherein the first computing device is distinct from the second computing device.

20. The AE subsystem of claim 15, wherein the proof of ownership comprises data indicative of information entered on the first computing device by a user of the first computing device in conjunction with authenticating the user account.

* * * * *